(12) United States Patent
Lei et al.

(10) Patent No.: US 10,264,186 B2
(45) Date of Patent: Apr. 16, 2019

(54) DYNAMIC CONTROL OF CAMERA RESOURCES IN A DEVICE WITH MULTIPLE DISPLAYS

(71) Applicant: MICROSOFT TECHNOLOGY LICENSING, LLC, Redmond, WA (US)

(72) Inventors: Maria Cheng Lei, Bellevue, WA (US); Vishal Jain, Redmond, WA (US); Tomi Sokeila, Redmond, WA (US); Raymond Xue, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/639,584

(22) Filed: Jun. 30, 2017

(65) Prior Publication Data

US 2019/0007619 A1    Jan. 3, 2019

(51) Int. Cl.
*H04N 5/222* (2006.01)
*H04N 5/235* (2006.01)
(Continued)

(52) U.S. Cl.
CPC ....... *H04N 5/23293* (2013.01); *G06F 1/1647* (2013.01); *G06F 1/1649* (2013.01); *H04N 5/247* (2013.01); *G06F 1/1692* (2013.01)

(58) Field of Classification Search
CPC .. H04N 5/23293; H04N 5/247; G06F 1/1647; G06F 1/1649; G06F 1/1654; G06F 1/1692; H04M 1/0233
(Continued)

(56) References Cited

U.S. PATENT DOCUMENTS 7,046,287 B2 * 5/2006 Nishino .............. H04M 1/0216
348/333.06
7,145,593 B2 12/2006 Yamaguchi et al.
(Continued)

FOREIGN PATENT DOCUMENTS

GB    2394381 A    4/2004

OTHER PUBLICATIONS

Steele, David., "Samsung's Dual Screen Foldable Designs Explored", https://www.androidheadlines.com/2015/06/samsungs-dual-screen-foldable-designs-explored.html, Jun. 8, 2015, 11 pages.
(Continued)

*Primary Examiner* — Ngoc Yen T Vu
(74) *Attorney, Agent, or Firm* — Arent Fox LLP

(57) ABSTRACT

Methods and devices for dynamically controlling mirroring of a preview image may include receiving physical location information of a selected camera resource on the computer device, wherein the physical location information corresponds to a static orientation of the camera resource. The methods and devices may include determining a dynamic orientation of the selected camera resource based on sensor information for the selected camera resource and determining a camera role of the selected camera resource based on the dynamic orientation and the static orientation of the selected camera, wherein the camera role comprises a front facing camera role or a rear facing camera role. The methods and devices may include displaying a mirrored preview image when the camera role of the selected camera resource is the front facing camera role and displaying a non-mirrored preview image when the camera role of the selected camera resource is the rear facing camera role.

17 Claims, 13 Drawing Sheets

(51) Int. Cl.
 *H04N 5/232* (2006.01)
 *H04N 5/247* (2006.01)
 *G06F 1/16* (2006.01)

(58) Field of Classification Search
 USPC .................... 348/333.01, 333.06, 333.07
 See application file for complete search history.

(56) References Cited

U.S. PATENT DOCUMENTS

| | | | |
|---|---|---|---|
| 7,173,665 | B2 | 2/2007 | Kawasaki et al. |
| 7,190,968 | B2 * | 3/2007 | Nakamura .......... H04M 1/0214 |
| | | | 345/169 |
| 7,395,102 | B2 | 7/2008 | Park et al. |
| 7,612,766 | B2 * | 11/2009 | Shintome .............. G06F 1/1616 |
| | | | 345/173 |
| 7,817,187 | B2 | 10/2010 | Silsby et al. |
| 8,654,238 | B2 * | 2/2014 | Fujinawa .......... H04N 1/00442 |
| | | | 348/333.01 |
| 9,571,734 | B2 | 2/2017 | Kwak et al. |
| 9,742,989 | B2 * | 8/2017 | Ishizuka ................. G03B 9/64 |
| 2001/0005454 | A1 | 6/2001 | Nishino et al. |
| 2004/0023685 | A1 | 2/2004 | Nakamura |
| 2005/0110874 | A1 | 5/2005 | Song |
| 2006/0117528 | A1 | 6/2006 | Duan et al. |
| 2008/0146289 | A1 | 6/2008 | Korneluk et al. |
| 2012/0218202 | A1 * | 8/2012 | Sirpal ................... G06F 1/1616 |
| | | | 345/173 |
| 2013/0156209 | A1 | 6/2013 | Visser et al. |
| 2014/0362257 | A1 | 12/2014 | Viljamaa et al. |
| 2015/0365590 | A1 | 12/2015 | Ishizuka |
| 2016/0037037 | A1 | 2/2016 | Zou |
| 2016/0109908 | A1 | 4/2016 | Siddiqui |
| 2016/0282964 | A9 * | 9/2016 | Kim ..................... G06F 3/03545 |

OTHER PUBLICATIONS

"OPPO N1", http://www.oppo.com/en/smartphone-n1, Retrieved on: Apr. 3, 2017, 17 pages.
"International Search Report and Written Opinion Issued in PCT Application No. PCT/US18/034008", dated Aug. 8, 2018, 15 Pages.
"Non Final Office Action Issued in U.S. Appl. No. 15/666,406", dated Nov. 1, 2018, 11 Pages.

* cited by examiner

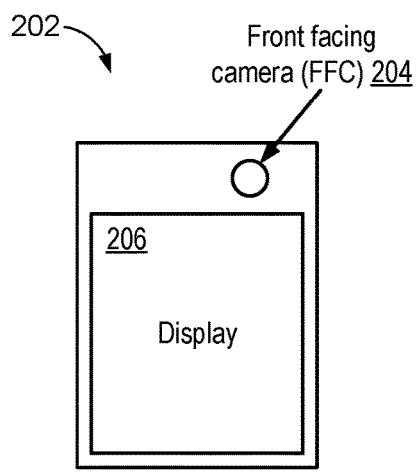
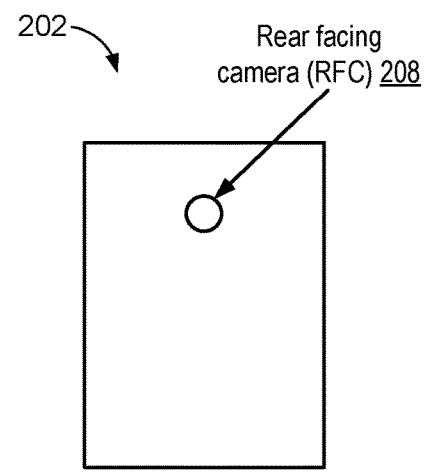
FIG. 2A
FIG. 2B

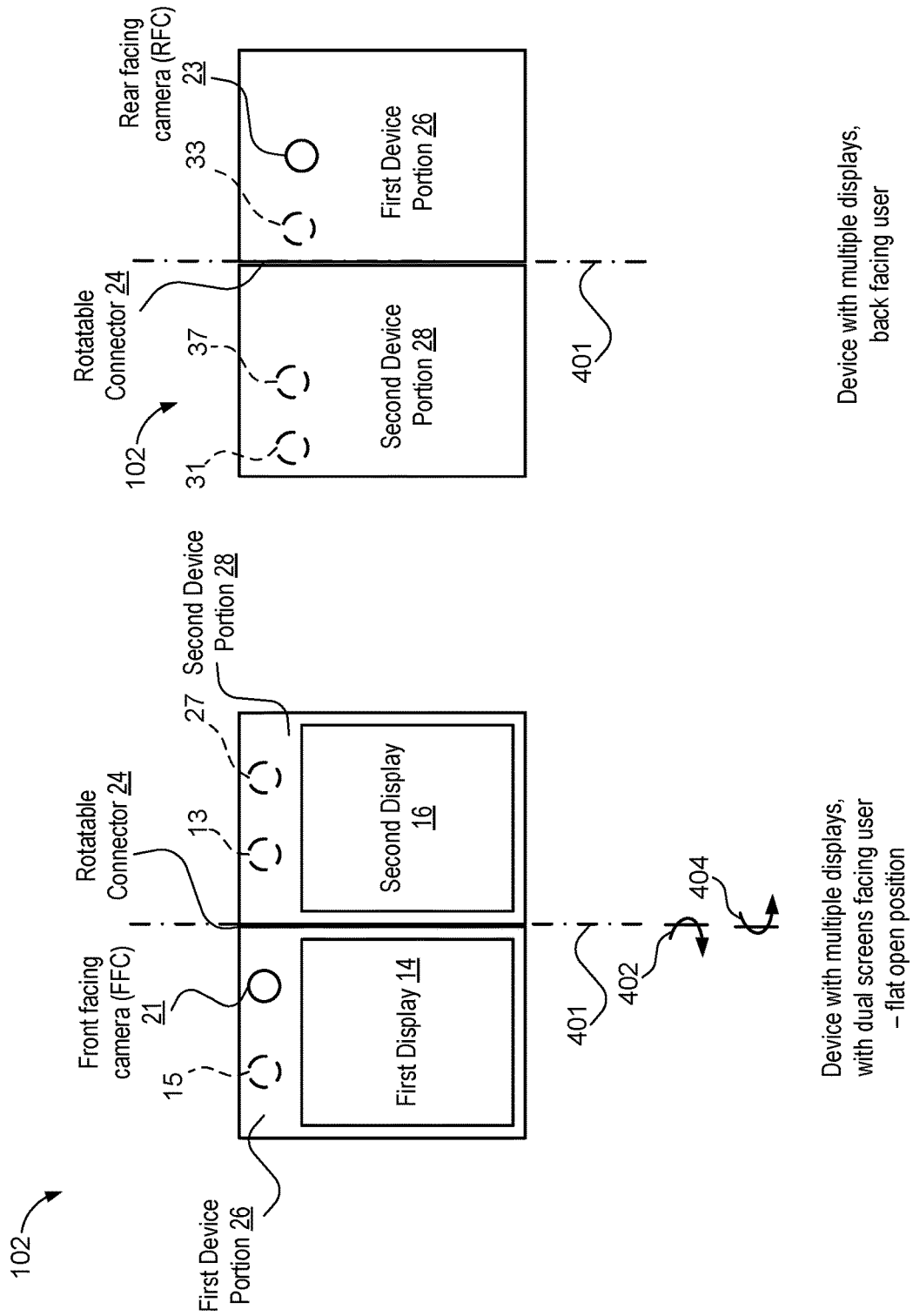

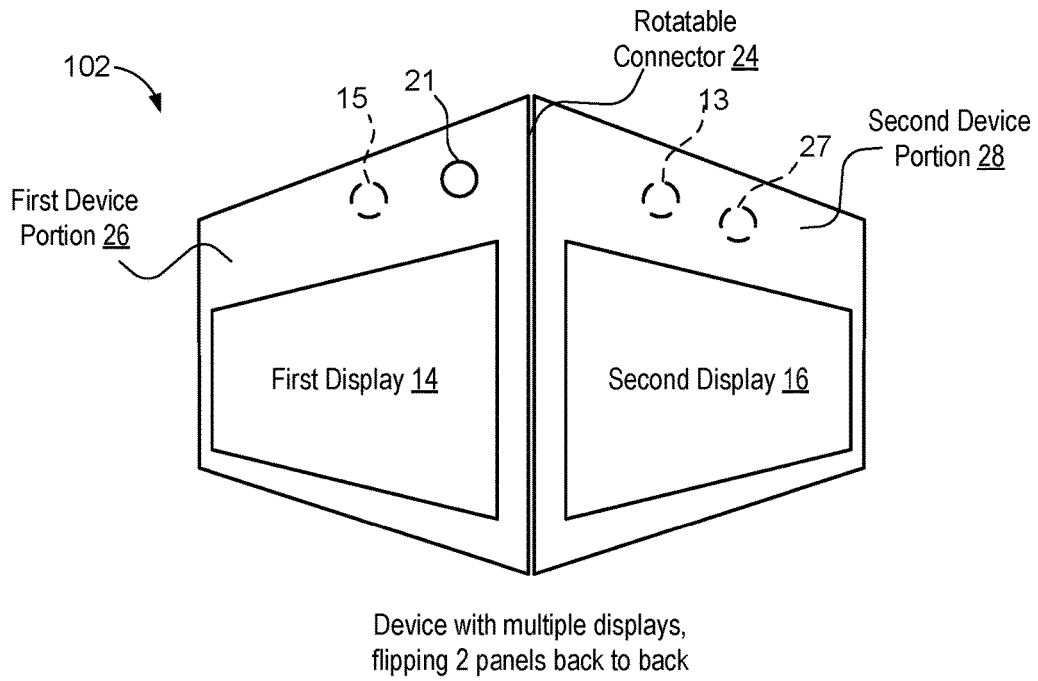
FIG. 5A
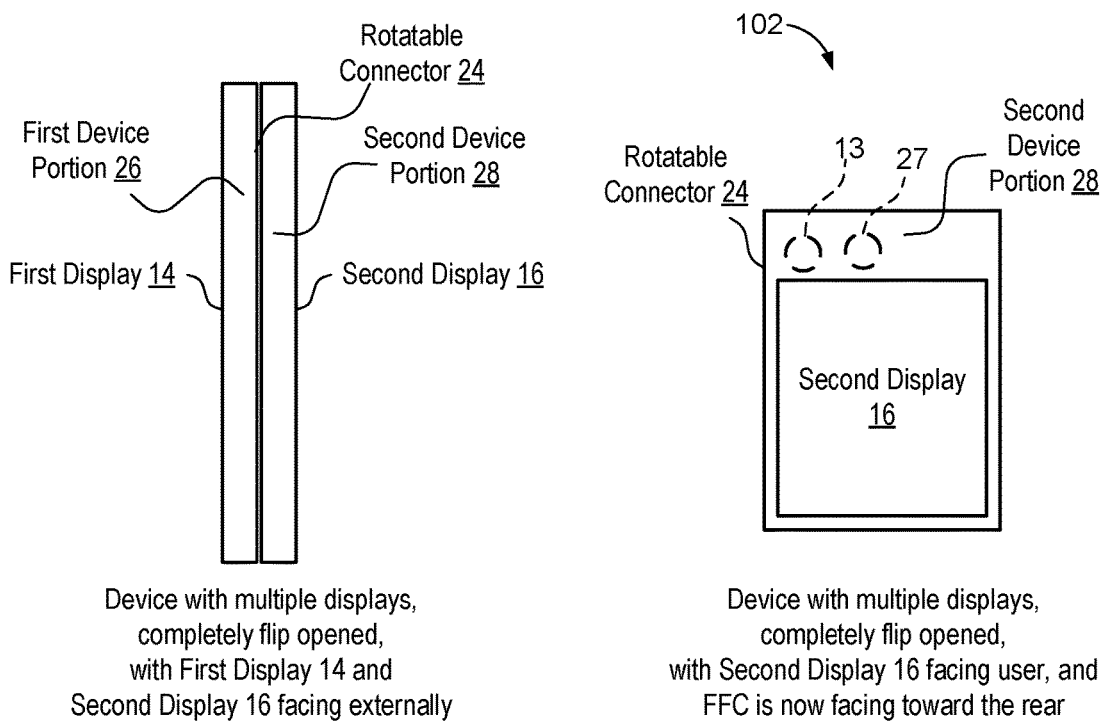
FIG. 5B
FIG. 5C

DYNAMIC CONTROL OF CAMERA RESOURCES IN A DEVICE WITH MULTIPLE DISPLAYS

BACKGROUND

The present disclosure relates to a computer device, and more particularly, to image and video capture using a computer device.

A computer device may include multiple cameras for taking photographs and/or obtaining video. The physical location of a camera on the computer device is generally static, and each camera may have an orientation that is defined relative to a side of the device. For instance, a front-facing camera mounted on a front side (e.g., a side facing the user) of the device is generally used to obtain images of the environment toward the front side of the device, and a rear-facing camera mounted on a rear side of the device is generally used to obtain images of the environment toward the rear side of the device. Depending on how or if a display is being used by a user, however, a camera orientation relative to the device may change. For example, a camera orientation may change from being a front-facing to being rear-facing depending on how the user is holding the device and/or depending on the orientation of one or more displays. As such, a camera may have multiple orientations relative to the device and/or a user.

Thus, there is a need in the art for improvements in image and video capture on a computer device.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a first display comprising a first device portion comprising a first display, a second device portion comprising a second display, a memory to store data and instructions, a processor in communication with the memory, an operating system in communication with the memory and processor. The operating system may be operable to receive physical location information of a selected camera resource on the computer device, wherein the physical location information corresponds to a static orientation of the camera resource on the computer device, determine a dynamic orientation of the selected camera resource based on sensor information for the selected camera resource, wherein the sensor information includes a connector status of a connector that rotatably connects the first display and the second display, determine a camera role of the selected camera resource based on the dynamic orientation and the static orientation of the selected camera, wherein the camera role comprises a front facing camera role or a rear facing camera role, display a mirrored preview image when the camera role of the selected camera resource is the front facing camera role, display a non-mirrored preview image when the camera role of the selected camera resource is the rear facing camera role.

Another example implementation relates to a method for dynamically for dynamically updating an image preview. The method may include receiving, by an operating system on a computer device, physical location information of a selected camera resource on the computer device, wherein the physical location information corresponds to a static orientation of the camera resource on the computer device. The method may also include determining a dynamic orientation of the selected camera resource based on sensor information for the selected camera resource, wherein the sensor information includes a connector status of a connector that rotatably connects a first display and a second display of the computer device. The method may also include determining a camera role of the selected camera resource based on the dynamic orientation and the static orientation of the selected camera, wherein the camera role comprises a front facing camera role or a rear facing camera role. The method may also include displaying a mirrored preview image when the camera role of the selected camera resource is the front facing camera role and displaying a non-mirrored preview image when the camera role of the selected camera resource is the rear facing camera role.

Another example implementation relates to computer-readable medium storing instructions executable by a computer device. The computer-readable medium may include at least one instruction for causing the computer device to receive physical location information of a selected camera resource on the computer device, wherein the physical location information corresponds to a static orientation of the camera resource on the computer device. The computer-readable medium may include at least one instruction for causing the computer device to determine a dynamic orientation of the selected camera resource based on sensor information for the selected camera resource, wherein the sensor information includes a connector status of a connector that rotatably connects a first display and a second display of the computer device. The computer-readable medium may include at least one instruction for causing the computer device to determine a camera role of the selected camera resource based on the dynamic orientation and the static orientation of the selected camera, wherein the camera role comprises a front facing camera role or a rear facing camera role. The computer-readable medium may include at least one instruction for causing the computer device to display a mirrored preview image when the camera role of the selected camera resource is the front facing camera role. The computer-readable medium may include at least one instruction for causing the computer device to display a non-mirrored preview image when the camera role of the selected camera resource is the rear facing camera role.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

In the drawings:

FIGS. 2A and 2B are front and rear views, respectively, of a traditional form factor device with a front facing camera and a rear facing camera in accordance with an implementation of the present disclosure;

FIGS. 4A and 4B are front and rear plan views, respectively, of an example device with multiple displays with front facing cameras and rear facing cameras in accordance with an implementation of the present disclosure;

FIGS. 5A-5C are plan views of different positions of a device with multiple displays in accordance with an implementation of the present disclosure;

DETAILED DESCRIPTION

Figure 1A:
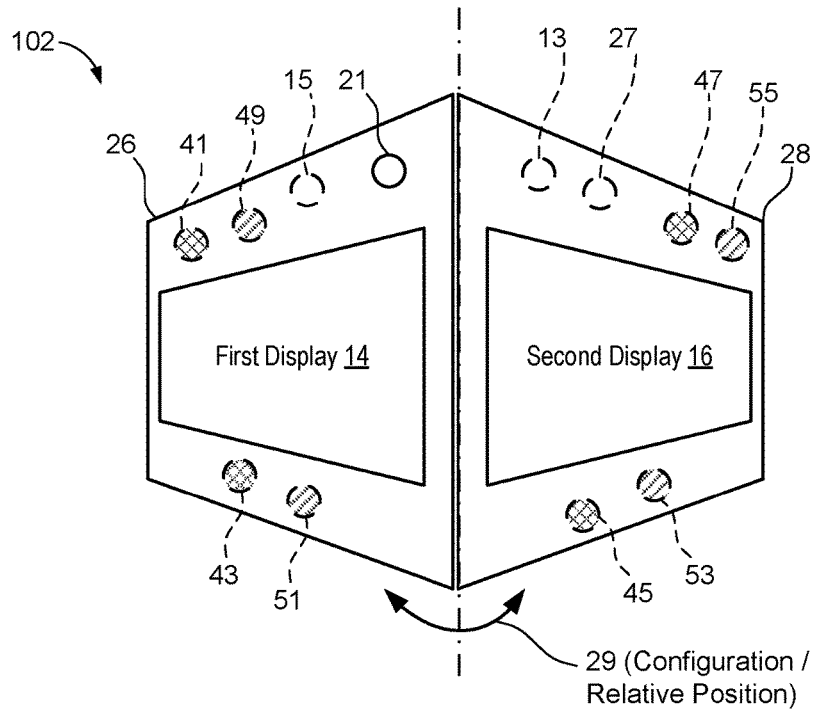
FIGS. 1A and 1B are a schematic block diagrams of an example computer device in accordance with an implementation of the present disclosure.
Figure 1B:
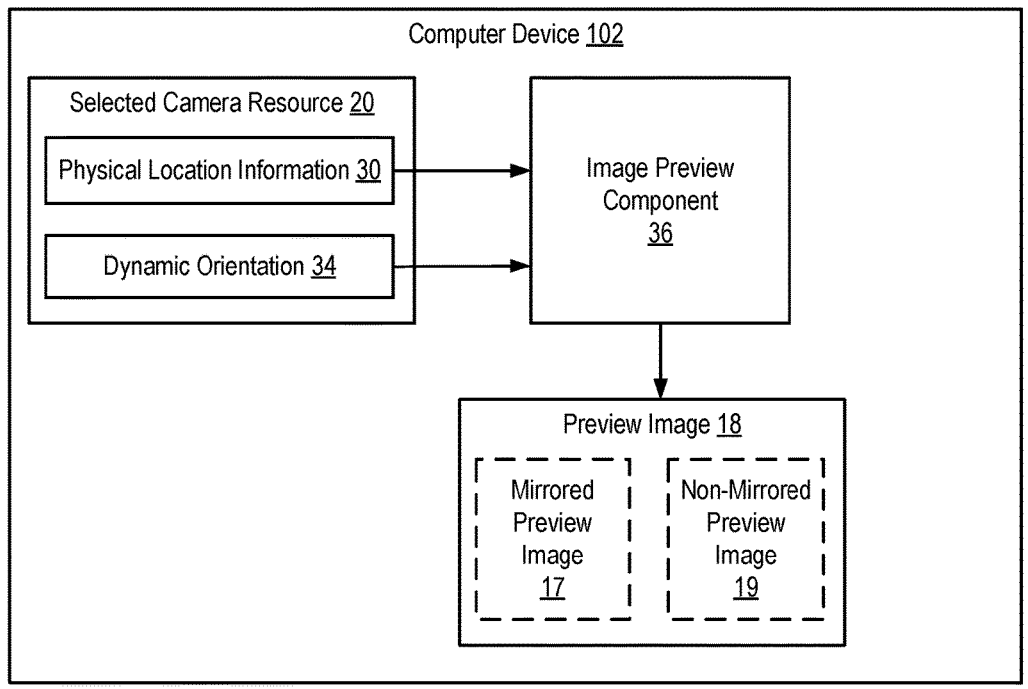

Referring to FIGS. 1A and 1B, this disclosure relates to devices and methods of dynamically controlling mirroring of a preview image when using a computer device 102 having multiple displays. Devices with multiple displays may include any computing device with at least a first display 14 on a first device portion 26 that is rotatably connected to a second device portion 28 having at least a second display 16. In addition, devices with multiple displays may include any computing device with a display on two different sides of a device (e.g., a first display 14 on a first device portion 26 and another display on a rear surface of the first device portion 26). A configuration and/or relative position 29 of the first and second device portions 26, 28, and hence an orientation of the corresponding displays 14, 16 relative to the device and/or a user, may change based on relative rotation of the first and second device portions 26, 28. Further, at least one of the first and second device portions 26, 28 may also include one or more camera resources 13, 15, 21, and 27, where each camera resource 13, 15, 21, and 27 may be associated with a camera role, e.g., a forward camera facing role or a rear facing camera role, depending on a static orientation of the camera resource, e.g., a physical location information 30 of the camera resources 13, 15, 21, and 27 on the computer device 102. In addition, at least one of the first and second device portions 26 and 28 may also include one or more camera resources 23 (FIG. 4B), 31 (FIG. 4B), 33 (FIG. 4B), and 37 (FIG. 4B), which may be associated with a camera role, on the rear portion of the first and second device portions 26 and 28. A forward facing camera role is associated with a forward facing camera resource, e.g., facing toward a front side of the device, which is also generally associated with facing a user of the device. The forward facing camera role is also associated with presenting a mirrored preview image 17 on a corresponding one of the displays 14, 16. For example, when using a forward facing camera, a user sees a mirrored preview image 17 of the scene toward the front side of the device, such as when a user previews a selfie picture. In contrast, the rear facing camera role is associated with a rear facing camera, and also with presenting a non-mirrored preview image 19. In other words, the non-mirrored preview image 19 is an image that matches a view of a scene as observed by a user of the device. When a respective camera resource 20 is selected for use to capture an image and/or video, for example, camera resource 21, a dynamic orientation 34 of the selected camera resource 20 may change based on the configuration and/or relative position of the first and second device portions 26, 28, or of the display panels. When the dynamic orientation 34 of the selected camera resource is different from the static orientation of the camera resource, the devices and methods described herein may change the camera role of the selected camera resource 20. An image preview component 36 may receive the camera role of the selected camera resource 20 and may update the preview image 18 based on the received camera role. Thus, the devices and methods may dynamically update and present the preview image 18, either as a mirrored preview image 17 or a non-mirrored preview image 19, in response to changes in the dynamic orientation 34 of the selected camera resource 20.

Devices with multiple displays may also include one or more microphones 41, 43, 45, and 47 and/or speakers 49, 51, 53, and 55 on each device portion 26, 28. The devices and methods may dynamically select one or more microphones 41, 43, 45, and 47 and/or speakers 49, 51, 53, and 55 to use based on, for example, an orientation of the corresponding device portions 26, 28. For example, the device portions 26, 28 may be opened flat with the first display 14 and/or the second display 16 facing the same direction, and hence the microphones 41, 43, 45, and 47 and speakers 49, 51, 53, and 55 are facing in the same direction and one or all may be selected for use. In another example, if the computer device 102 is closed or partially closed with first display 14 and/or the second display 16 (and the corresponding microphones and speakers) facing in different directions, then the specific microphones and/or speakers associated with a given one of the portions may be selected for use depending on the direction they are facing. As such, as the orientation of the devices portions 26, 28 changes, the devices and methods may dynamically change the selected microphones and/or speakers to use.

In addition, the devices and methods may dynamically select one or more microphones 41, 43, 45, and 47 and/or speakers 49, 51, 53, and 55 based on the application 10 (FIG. 6) executing on the computer device 102. When different applications 10 request to use a microphone 41, 43, 45, and 47 and/or speaker 49, 51, 53, and 55, the devices and methods may change the selected microphones and/or speakers based on the application in use.

On a traditional form factor device, such as a tablet, laptop, or mobile phone, there may be multiple cameras on the device. For example, referring now to FIGS. 2A and 2B, a traditional form factor device 202 may include a front facing camera 204 and a rear facing camera 208. The front facing camera 204 may be physically located on a side of device 202 that includes the screen/display 206, and generally faces the user in most situations. When a user is using the front-facing camera 204, such as when taking a selfie photograph, the preview frames displaying on display 206 are generally mirrored, as illustrated in FIG. 3.

Figure 3:
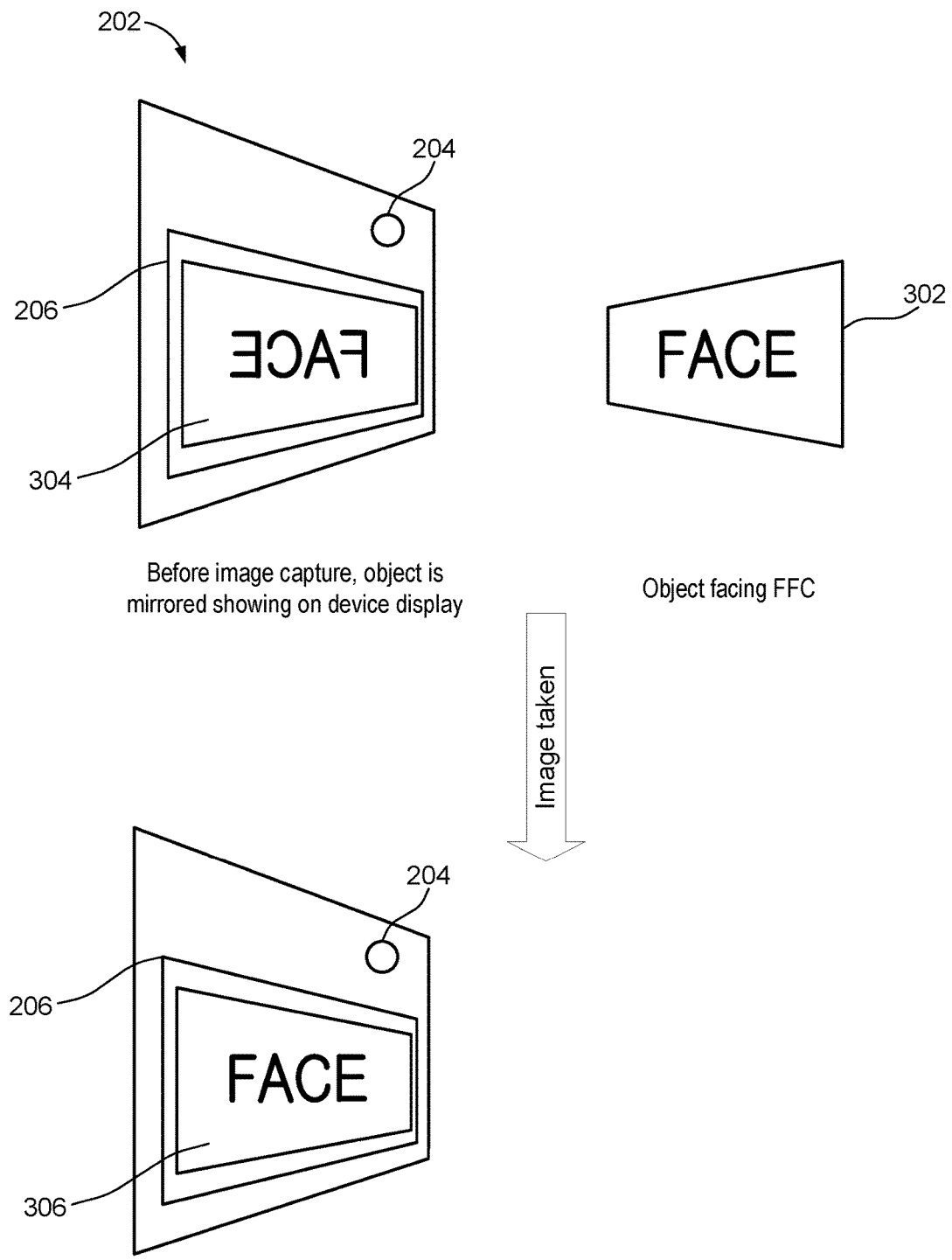
FIG. 3 is a schematic diagram of an example of a preview image and a captured image of an object when using a traditional form factor device in accordance with an implementation of the present disclosure.

Referring now to FIG. 3, for example, when device 202 uses front facing camera 204 to capture an object 302, display 206 may mirror the preview image 304 of the object 302. As illustrated in the example, the word "FACE" of object 302 may be mirrored in the preview image 304. Mirroring the preview image may be helpful to the user because the preview may help frame the image (e.g., by making sure everyone is included in the frame). Generally, the captured image 306 (illustrated as being displayed by display 206) may not be mirrored. Some camera applications may allow a user to pre-select to save a mirrored or non-mirrored image taken from the camera.

Referring back to FIGS. 2A and 2B, a camera application generally obtains a physical location of a camera on device 202 to determine whether the camera may be a front-facing camera 204 or a rear facing camera 208. The physical location of a camera is generally static. For example, a front facing camera 204 on a front face of device 202 is generally referred to and utilized as a front-facing camera (FFC), and a rear facing camera 208 on a rear surface of device 202 is generally referred to and utilized as a rear-facing camera (RFC).

Referring now to FIGS. 4A, 4B, and 5A to 5C, a computer device 102 with multiple displays may include one or more front facing cameras 15, 21 on a first device portion 26 and one or more front facing cameras 13 and 27 on the second device portion 28. In addition, computer device 102 may include one or more rear facing cameras 37 and 31 on a second device portion 28 and one or more rear facing cameras 23 and 33 on a first device portion 26. In addition, computer device 102 may include a first display 14 and a second display 16 with a rotatable connector 24, such as but not limited to a hinge, movably connecting the first device portion 26 and the second device portion 28. For example, rotatable connector 24 allows each or both of first device portion 26 and second device portion 28 to rotate relative to the other about axis 401. As such, computer device 102 may be oriented with first device portion 26 and second device portion 28 in one of a plurality of positions or configurations. For instance, in FIG. 4A, a user may open computer device 102 such that the first display 14 and the second display 16 are lying flat, e.g., in substantially a same plane, where the front facing camera 21 is facing the user. Further, for instance in FIG. 5A, a user may also move the first display 14 in direction 402 and/or the second display 16 in direction 404 so that the first display 14 and the second display 16 move away from each other and are back-to-back.

FIG. 5B illustrates the first display 14 and the second display 16 folded completely back-to-back with the first display 14 and the second display 16 facing externally. When the first display 14 and the second display 16 start to move, the front facing cameras 15 and 21 may become oriented as a rear-facing cameras and the front facing cameras 13 and 27 may remain oriented as front facing cameras based on the position of the first display 14 and/or the second display 16, as illustrated in FIG. 5C. In FIG. 5C, the second display 16 may face the user while the first display 14 and the front facing cameras 15 and 21 are now facing the rear of computer device 102. For example, when the front facing cameras 15 and 21 change to a rear facing camera orientation, according to this disclosure, the preview image may no longer be mirrored when displaying on second display 16. In an implementation, the preview image may be simultaneously displayed on both the first display 14 and the second display 16 so that the preview image may no longer be mirrored on the second display 16, but may be mirrored on the first display 14. As such, the front facing cameras 15 and 21 may have a dual role depending on a given one of the plurality of positions or configurations of the device, including the actual orientation or location of the front facing cameras 15 and 21, and thus, the preview image may change as the role of the front facing camera changes. For example, the front facing camera may have a forward facing camera role, e.g., facing toward a front side of the device, which may also generally be associated with facing a user of the device. The forward facing camera role may also be associated with presenting a mirrored preview image on a corresponding one of the displays 14, 16. In addition, the front facing camera may also have a rear facing camera role that may be associated with presenting a non-mirrored preview image.

Figure 6:
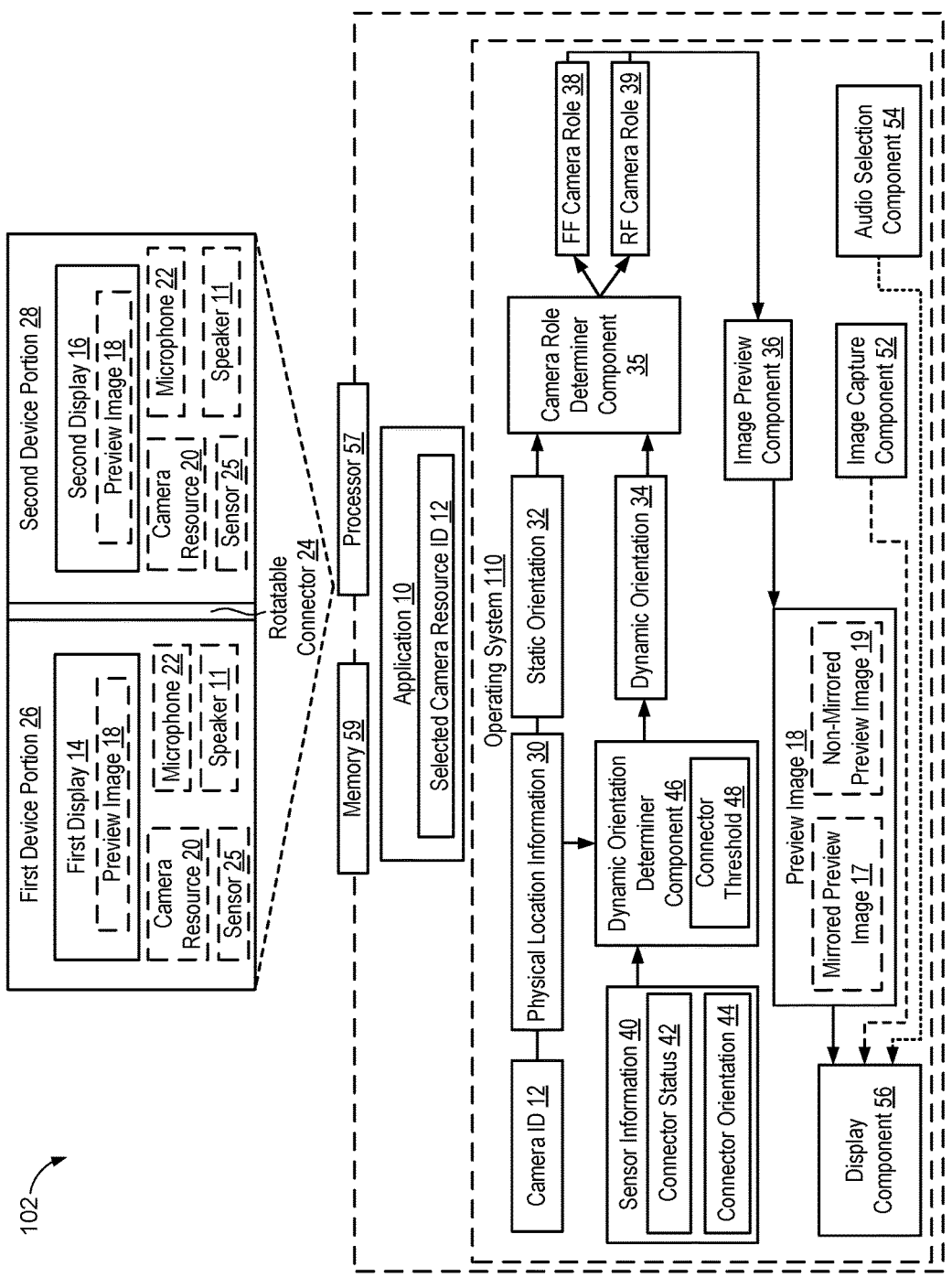
FIG. 6 is a schematic block diagram of an example computer device with multiple displays, and optionally, multiple microphones and speakers, in accordance with an implementation of the present disclosure.

Referring now to FIG. 6, an example computer device 102 with multiple displays for use in capturing images may include a plurality of applications 10 up to m applications 10 (where m is a positive number), that may be executed or processed by processor 57 and/or memory 59. The one or more applications 10 may want to use one or more camera resources 20 on computer device 102 to capture a scene and/or video, preview images, and/or perform video processing. For example, application 10 may be a video call application, such as but not limited to a SKYPE' application, and may want to use a camera resource 20 to capture images for a video call, while another application 10 may be a photo application and may want to use a camera resource 20 to capture an image for a photograph.

Computer device 102 may include a plurality of displays, such as a first display 14, a second display 16, and up to n displays (where n is a positive number), that may be executed by processor 57 to present one or more captured images or videos and/or preview images 18. For example, computer device 102 may include at least a first display 14 on a first device portion 26 that is rotatably connected to a second device portion 28 having at least a second display 16. In addition, computer device 102 may have one or more rotatable connectors 24, e.g., up to p connectors 24 (where p is a positive number), between the plurality of displays. For example, computer device 102 may have rotatable connector 24 between the first display 14 and the second display 16. Rotatable connector 24 may be a flexible and/or rotatable hinge that allows the plurality of displays to move different directions, e.g., to rotate relative to one another. A configuration and/or relative position 29 (FIG. 1) of the first and second device portions 26, 28, and hence an orientation of the corresponding display panels relative to the device and/or a user, may change based on relative rotation of the first and second device portions 26, 28.

Computer device 102 may also include a plurality of camera resources 20, such as one or more front facing camera resources and/or one or more rear facing camera resources that may be used to capture a scene and/or perform video processing. For example, at least one of the first and second device portions 26, 28 may also include one or more respective camera resources 20 (e.g., one or more front facing camera resources and/or one or more rear facing camera resources), where each camera resource 20 may be associated with a camera role, e.g., a forward facing camera role 38 or a rear facing camera role 39, depending on a static orientation of the camera resource, e.g., a physical location information 30 of the camera resource 20 on the computer device 102. As such, the first and second device portions 26, 28 may each include one or more front facing camera resources and/or one or more rear facing camera resources. An example of such plurality of camera resources 20 may include camera resources 13, 15, 21, and 27, as described above with reference to FIG. 1.

Computer device 102 may also include a plurality of microphones 22 that may be used to record audio information corresponding to when the image and/or video is captured. The microphones 22 may have a physical location on computer device 102. In an implementation, the physical location of the microphones 22 may correspond to a static orientation of the one or more microphones on the computer device 102. For example, the physical location may indicate that the microphone 22 is on the front of the computer device 102, the rear of the computer device 102, and/or on a certain area of such locations (e.g., top (left/center/right) front facing speaker, bottom (left/center/right) front facing speaker, and similar terms for similar rear facing speakers). An example of such plurality of microphones 22 may include microphones 41, 43, 45, and 47, as described above with reference to FIG. 1.

Computer device 102 may also include a plurality of speakers 11 that may be used to play and/or output audio. The speakers 11 may have a physical location on computer device 102 that may correspond to a static orientation of the one or more speakers 11 on the computer device 102. As such, the physical location may indicate that the speaker is on the first device portion 26, the second device portion 28, the front of the computer device 102, the rear of the computer device 102, and/or on a certain area of such locations (e.g., top (left/center/right) front facing speaker, bottom (left/center/right) front facing speaker, and similar terms for similar rear facing speakers). An example of such plurality of speakers 11 may include speakers 49, 51, 53, and 55, as described above with reference to FIG. 1.

In addition, computer device 102 may include a plurality of sensors 25 up to r sensors 25 (where r is a positive number), that may be used to determine a position and/or orientation of the first device portion 26, the second device portion 28, the first display 14, the second display 16, and/or camera resources 20. Sensors 25 may include, but are not limited to, a hinge sensor, an accelerometer, a gyroscope, and a magnetometer. Sensors 25 may identify various movement and/or positions of the connectors 24 to determine a relative position of the device portions (e.g., a measure of how the first device portion 26 and/or the second device portion 28 are angularly position) and/or a general orientation of the first display 14 and/or the second display 16 (e.g., which direction the displays are facing).

Computer device 102 may also include an operating system 110 executed by processor 57 and/or memory 59 of computer device 102. Memory 59 of computer device 102 may be configured for storing data and/or computer-executable instructions defining and/or associated with operating system 110, and processor 57 may execute operating system 110. An example of memory 59 can include, but is not limited to, a type of memory usable by a computer, such as random access memory (RAM), read only memory (ROM), tapes, magnetic discs, optical discs, volatile memory, non-volatile memory, and any combination thereof. An example of processor 57 can include, but is not limited to, any processor specially programmed as described herein, including a controller, microcontroller, application specific integrated circuit (ASIC), field programmable gate array (FPGA), system on chip (SoC), or other programmable logic or state machine.

Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices and/or communication networks.

Application 10 may receive a selection for a camera resource 20 to use to capture an image and/or video. The selected camera resource 20 may be automatically selected by application 10, for example, based on the camera resource used most recently by the computer device 102. In addition, the selected camera resource 20 may be selected by a user. The selected camera resource 20 may be, for example, a front facing camera resource and/or a rear facing camera resource. The selected camera resource 20 may have an associated selected camera resource identification (ID) 12 that identifies the selected camera resource 20.

The selected camera resource ID 12 may be associated with physical location information 30 of the selected camera resource 20. The physical location information 30 may correspond to a static orientation 32 of the selected camera resource 20 on computer device 102 (e.g., on a side of the computer device 102 that includes first display 14 and second display 16 or on a rear surface of the computer device 102). A data repository associated with computer device 102 may contain the physical location information 30 of the camera resources 20 on computer device 102.

In addition, the selected camera resource 20 may be associated with a dynamic orientation 34. A dynamic orientation 34 of the selected camera resource 20 may change based on the configuration and/or relative position of the first and second device portions 26, 28, or of the first display 14 and/or the second display 16. A dynamic orientation 34 of the selected camera resource 20 may be determined by a dynamic orientation determiner component 46.

The dynamic orientation determiner component 46 may receive sensor information 40 from one or more sensors 25 on computer device 102. Sensor information 40 may include a connector status 42 indicating a relative angular distance between the first display 14 and the second display 16.

Sensor information 40 may also include a sensor orientation 44 that indicates an orientation of the one or more displays. For example, the sensor orientation 44 may indicate a general orientation of the first display 14 and/or the second display 16. A general orientation of the first display 14 and the second display 16 may indicate which direction the first display 14 and/or the second display 16 are facing (e.g., towards a user and/or away from a user).

The sensor orientation 44 may also indicate a relative position of the first display 14 and/or the second display 16. For example, the sensor orientation may indicate a measure of how the first display 14 and/or the second display 16 are relatively angularly positioned. As such, the sensor orientation 44 may be used to indicate whether the computer device 102 is opened flat with the first display 14 and/or the second display 16 facing the same direction, and hence the camera resources 20 facing in the same direction), or if the computer device 102 is closed or partially closed with first display 14 and/or the second display 16 and the corresponding camera resources 20 facing in different directions.

As such, when a user moves first display 14 and/or second display 16, the sensor information 40 may be updated and the dynamic orientation determiner component 46 may update the dynamic orientation 34 of the selected camera resources 20.

Dynamic orientation determiner component 46 may apply one or more rules to determine when the dynamic orientation 34 of a selected camera resource 20 may be front facing and/or a rear facing. The dynamic orientation determiner component 46 may include a connector threshold 48 that may be used in determining when to update the dynamic orientation 34 of the selected camera resource 20. For example, when the sensor information 40 indicates that the connector 24 exceeds a connector threshold 48, the dynamic orientation 34 may be rear facing. Another example may include when the sensor information 40 indicates that sensor orientation 44 of the first display 14 is facing away from a user, the dynamic orientation 34 of the selected camera resource 20 may be rear facing.

The static orientation 32 and the dynamic orientation 34 of the selected camera resource 20 may be transmitted to the camera role determiner component 35. The camera role determiner component 35 may determine a camera role for the selected camera resource 20. A camera role may include a forward facing camera role 38 and/or a rear facing camera role 39. For example, a forward facing camera role 38 may be associated with a forward facing camera resource, e.g., facing toward a front side of the computer device 102, which is also generally associated with facing a user of the computer device 102. The forward facing camera role 38 may also be associated with presenting a mirrored preview image 17 on a corresponding one of the displays 14, 16. For example, when using a forward facing camera, a user sees a mirrored preview image 17 of the scene toward the front side of the device, such as when a user previews a selfie picture. In contrast, the rear facing camera role 39 may be associated with a rear facing camera, and also with presenting a non-mirrored preview image 19. In other words, the non-mirrored preview image 19 is an image that matches a view of a scene as observed by a user of the device.

When the dynamic orientation 34 of the selected camera resource 20 is different from the static orientation 32 of the selected camera resource 20, the camera role of the selected camera resource 20 may change. For example, the camera role may change from a forward facing camera role 38 to a rear facing camera role 39 or from a rear facing camera role 39 to a forward facing camera role 38 based on a current orientation (e.g., dynamic orientation 34) of the selected camera resource 20.

An image preview component 36 may receive the camera role of the selected camera resource 20 and may determine whether the preview image 18 should be a mirrored preview image 17 and/or a non-mirrored preview image 19 based on the received camera role. For example, when the received camera role is a forward facing camera role 38, the image preview component 36 may determine that the preview image 18 should be a mirrored preview image 17. When the received camera role is a rear facing camera role 39, the image preview component 36 may determine that the preview image 18 should be a non-mirrored preview image 19.

The image preview component 36 may transmit the preview image 18 to display component 56 for presentation on a first display 14 and/or a second display 16. For example, the image preview component 36 may forward the mirrored preview image 17 to a display component 56 to display the mirrored preview image 17 when using a forward facing camera. As such, a user may see a mirrored preview image 17 of the scene toward the front side of the device, such as when a user previews a selfie picture.

When the received camera role is a rear facing camera role 39, the image preview component 36 may determine that the preview image 18 should be a non-mirrored preview image 19. The image preview component 36 may transmit the non-mirrored preview image 19 to a display component 56 to display the non-mirrored preview image 19 on the first display 14 and/or the second display 16. In other words, the non-mirrored preview image 19 is an image that matches a view of a scene as observed by a user of the device.

As such, image preview component 36 may dynamically update and present the preview image 18, either as a mirrored preview image 17 or a non-mirrored preview image 19, in response to changes in the dynamic orientation 34 of the selected camera resource 20.

Computer device 102 may also include an image capture component 52 to capture an image 62 (FIG. 7) and/or video. The captured image 64 and/or video may be transmitted to display component 56 for presentation on the first display 14 and/or the second display 16.

Computer device 102 may also have an audio selection component 54 that may select one or more microphones 22 and/or speakers 11 for use with image and/or video capture. For example, a front facing microphone may be used when a video is being captured to record sound for the video. In addition, audio selection component 54 may select one or more microphones 22 and/or speakers 11 for use with an application 10. For example, during a Skype call when two users are using device 102 to participate in the call, with one user facing the first display 14 and the other user facing the second display 16, audio selection component 54 may select both a microphone 22 and a speaker 11 on the first device portion 26 and a microphone 22 and a speaker 11 on the second device portion 28 to use for the Skype call. The captured audio 74 (FIG. 7) from the one or more selected microphones 22 may be stored in synch with the captured image 64 (FIG. 7) for use by an application 10.

When an image and/or video is captured using the selected camera resource 20, the first display 14 and/or the second display 16 may be used to present the captured image to a user. Generally, the captured image may not be mirrored when presented to the user and/or saved. However, application 10 may allow a user to preselect whether the captured image may be displayed as a mirrored image and/or be saved as a mirrored image.

As such, as the selected camera resource 20 role changes (e.g., from a rear facing camera resource to a front facing camera resource) based on changes in position and/or orientation of the selected camera resource 20, the image preview component 36 may dynamically update the preview image 18 to a mirrored preview image 17 and a non-mirrored preview image based upon the changing roles of the selected camera resource 20.

Figure 7:
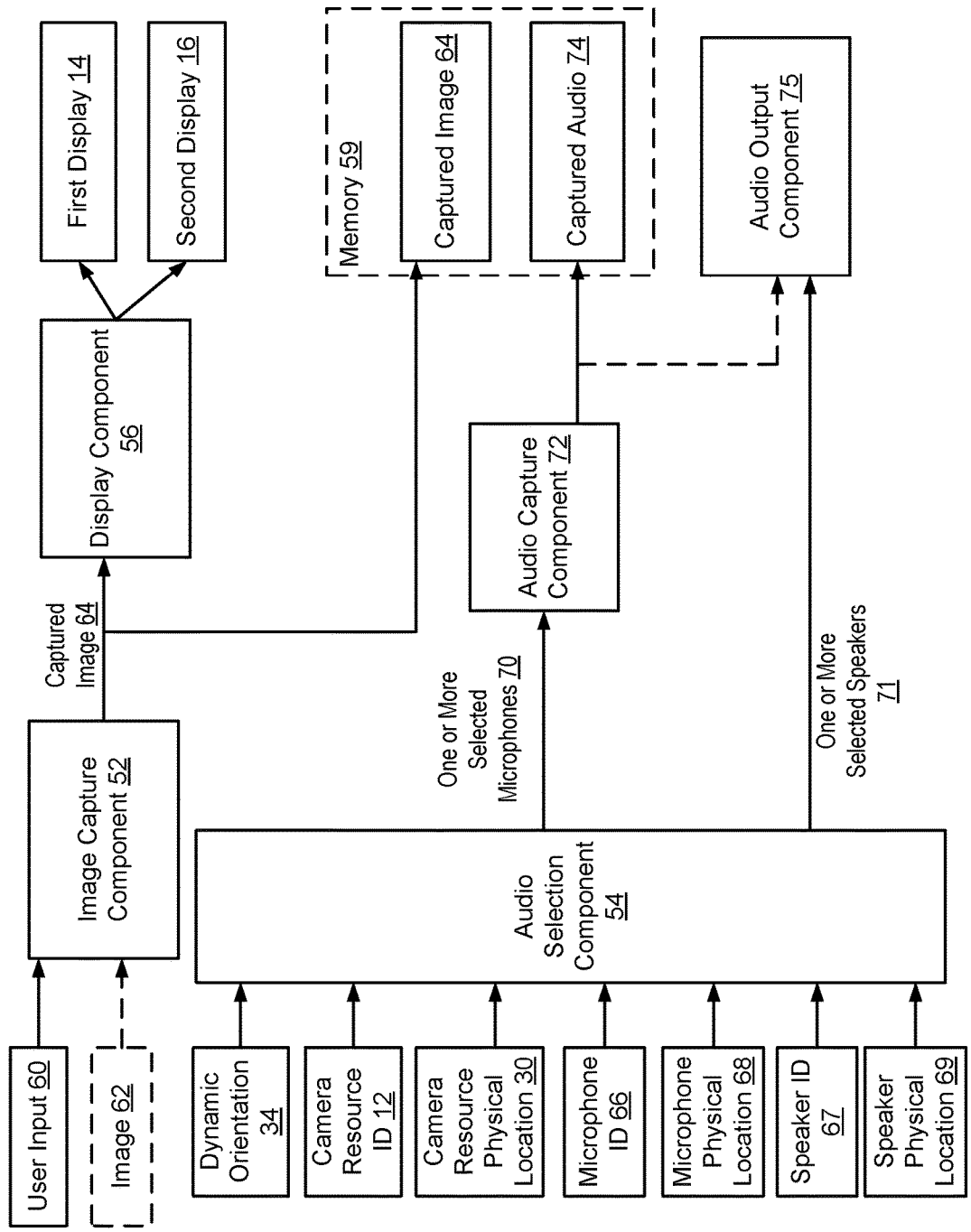
FIG. 7 is an example method flow for image capture and/or audio capture in accordance with an implementation of the present disclosure.

Referring now to FIG. 7, illustrated is an example method 700 that may be used by computer device 102 (FIG. 6) for image capture and/or audio capture. An image capture component 52 may receive user input 60 to capture an image 62 and/or video of a scene or object. For example, a user may touch computer device 102 (e.g., by pressing a button and/or an icon or touching the screen) to indicate that the image capture component 52 should capture the image 62 or start recording the video. The image capture component 52 may use the selected camera resource 20 (FIG. 6) to capture the image 62 and/or video in response to the user input.

The captured image 64 may be transmitted to memory 59 for storage. In addition, the captured image 64 may be transmitted to display component 56. Display component 56 may present the captured image 64 on one or more of a first display 14 (FIG. 6) and/or a second display 16 (FIG. 6).

In an implementation, one or more microphones 22 (FIG. 6) and/or speakers 11 (FIG. 6) may be selected for use with the image capture and/or video processing and output of computer device 102. An audio selection component 54 may select one or more microphones 22 and/or one or more speakers 11 based on one or more of a dynamic orientation 34 of the selected camera resource 20, a selected camera resource ID 12, physical location information 30 for the selected camera resource 20, a microphone ID 66, a microphone physical location 68, a speaker ID 67 and/or a speaker physical location 69. For example, audio selection component 54 may compare the dynamic orientation 34 of the selected camera resource 20 with the static orientation of the microphones (e.g., the microphone physical location 68) and select the one or more microphones 70 based on the comparison.

One example use case may include a user taking a selfie video. Audio selection component 54 may compare the dynamic orientation 34 of the selected camera resource 20 with the static orientation of the microphones (e.g., the microphone physical location 68) and may select one or more microphones on the device portion facing the user. For example, if the first device portion 26 is facing the user, audio selection component 54 may select microphones 41 and/or 43 for use by audio capture component 72 and to store the audio in synch with the captured video in memory 59.

The selected microphones 22 and/or speakers 11 may change as the image capture and/or image processing changes. In addition, the selected microphones 22 and/or speakers 11 may change as the orientation of the first device portion 26 and/or the second device portion 28 changes. For example, if a user is taking a video, audio selection component 54 may select the microphone 22 on the first device portion 26 or second device portion 28 facing the subject of the video. In addition, if a user is participating in a Skype call, audio selection component 54 may select a plurality of microphones 22 and/or speakers 11 to use with the call.

An audio capture component 72 may receive an identification of the one or more selected microphones 70 to use with the image and/or video capture. Audio capture component 72 may record the audio information from using the selected microphones 70 corresponding to when the image and/or video is captured. Audio capture component 72 may transmit the captured audio 74 to memory 59 for storage.

An audio output component 75 may receive an identification of the one or more selected speakers 71 and may use the one or more selected speakers 71 to transmit the audio corresponding to a received video. In addition, audio output component 75 may use the one or more selected speakers 71 to transmit audio corresponding to a use by an application 10. For example, a user may want to play a video that was captured by a camera resource 20 on computer device 102 using the first display 14. As such, audio selection component 54 may select speakers 49 and/or 51 on first device portion 26 to play the audio stored in synch with the captured video. Audio output component 75 may receive the selected speakers 71 (e.g., speakers 49 and/or 51) and may transmit the stored audio corresponding to the video using speakers 49 and/or 51.

Another example, may include a user using the computer device 102 to make a call. Audio selection component 54 may select speakers 53 and/or 55 on the second device portion 28 to participate in the call. Audio output component 75 may receive the selected speakers 71 (e.g., speakers 53 and/or 55) and may use speakers 53 and/or 55 to output the audio for the call.

Figure 8:
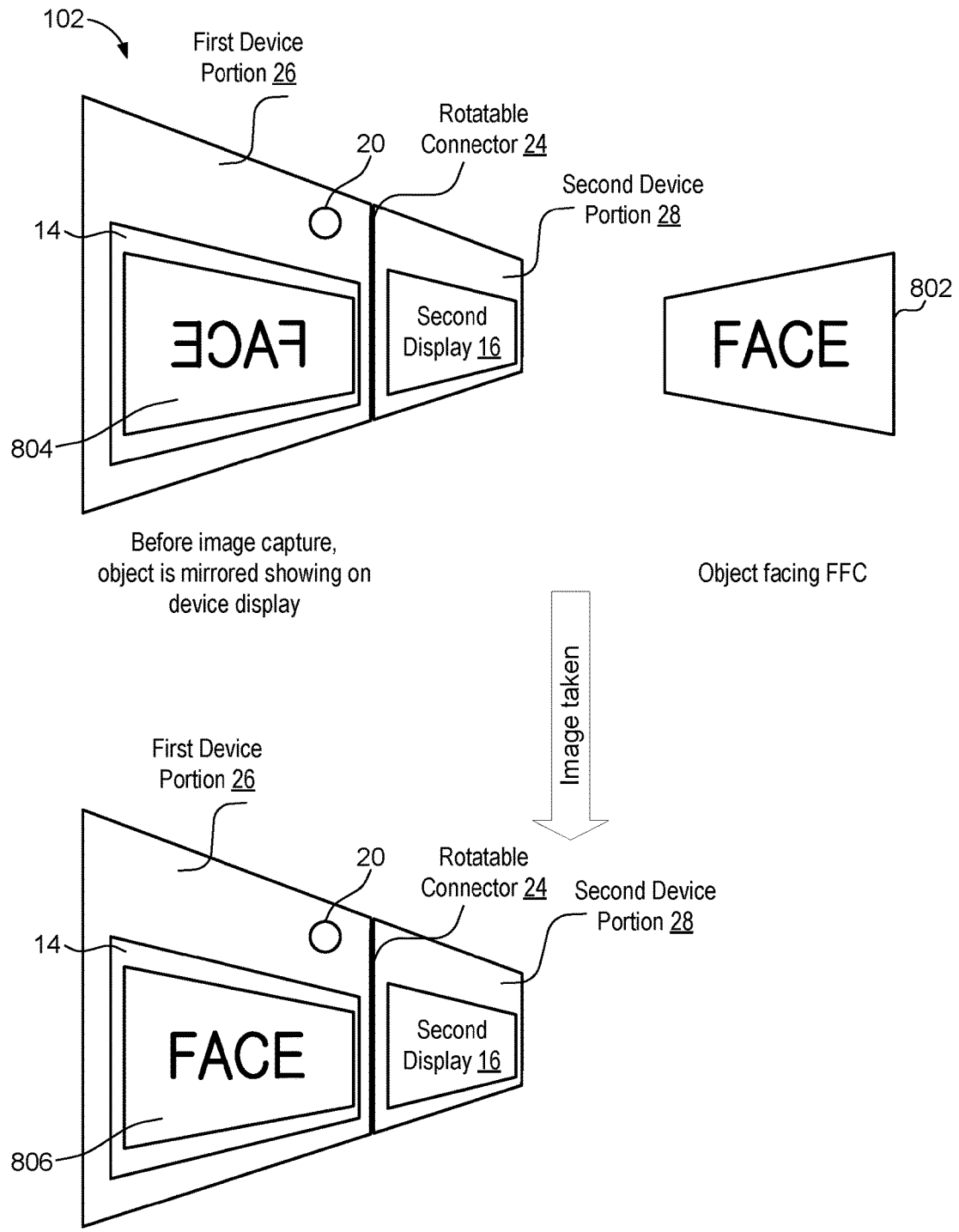
FIG. 8 is a schematic diagram of an example preview image and a captured image using a device with multiple displays in accordance with an implementation of the present disclosure.

Referring now to FIG. 8, illustrated is an example preview image and a captured image using computer device 102. For example, a user may be using a front facing camera resource 20 to capture an object 802. Computer device 102 may have a first display 14 that presents a mirrored preview image 804 of the object 802. Because the computer device 102 is using the front facing camera resource 20 to capture the object 802, image preview component 36 (FIG. 1) may determine that a mirrored preview image 804 should be displayed to the user. Once the image is taken, the first display 14 may present the captured image 806 without mirroring to the user.

Figure 9:
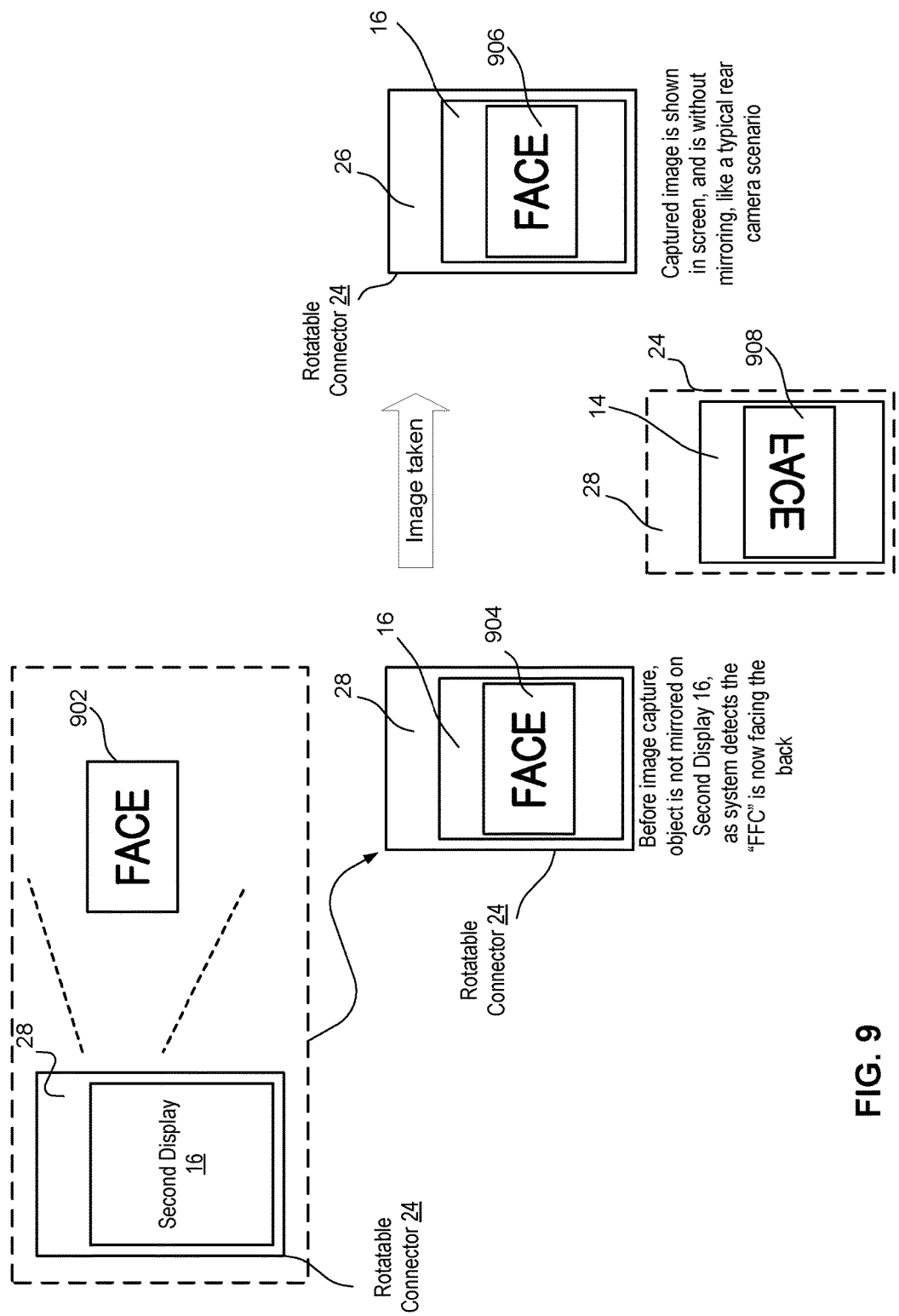
FIG. 9 is a schematic diagram of example of a preview image and a captured image using a device with multiple displays in accordance with an implementation of the present disclosure.

Referring now to FIG. 9, illustrated are example preview images when using a front facing camera resource as a rear facing camera resource and a captured image using computer device 102. For example, a user may be using a front facing camera resource 20 near the first display 14 to capture object 902. However, the user may have rotated the first display 14 so that the front facing camera resource 20 is now being used as a rear facing camera resource. As such, the preview image 904 displayed on the second display 16 of the object 902 prior to image capture may not be mirrored since the image preview component 36 (FIG. 1) may determine based on the camera role received that the front facing camera resource 20 is being used a rear facing camera resource. For example, the camera role may indicate that the front facing camera resource 20 may now be acting in a rear facing camera role 39. In addition, the camera role may indicate that the front facing camera resource 20 may now be acting in a front facing camera role 38.

In an implementation, a preview image 908 may also be displayed on the first display 14. The preview image 908 displayed on the first display 14 may be mirrored. For example, if a user is taking a picture of a friend, the preview image 904 displayed on the second display 16 may not be mirrored as discussed above. However, if the first display 14 is also presenting preview image 908 towards the friend, the preview image 908 may be mirrored. As such, both a mirrored preview image 908 and a non-mirrored preview image 904 may be presented on computer device 102 at the same time.

When the image is captured, the captured image 906 presented on the second display 16 may be displayed without mirroring.

Figure 10:
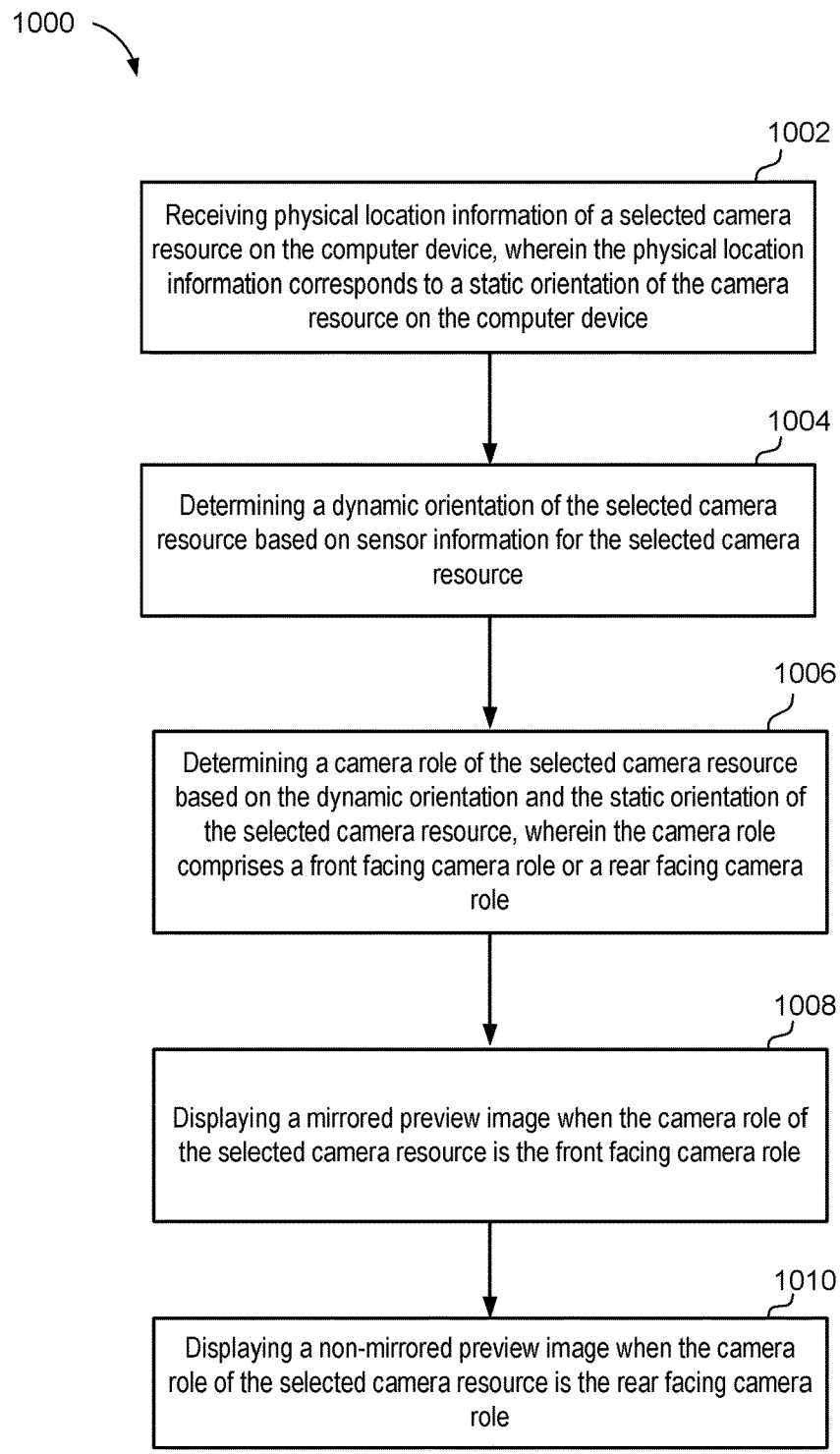
FIG. 10 is a flowchart of an example method for dynamically controlling mirroring of a preview image in accordance with an implementation of the present disclosure.

Referring now to FIG. 10, illustrated is an example method 1000 that may be used by computer device 102 (FIG. 6) for dynamically controlling mirroring of a preview image 18 (FIG. 6). An image preview component 36 (FIG. 6) may determine whether the preview image 18 may be a mirrored preview image 17 (FIG. 6) or a non-mirrored preview image 19 (FIG. 6).

At 1002, method 1000 may include receiving physical location information of a selected camera resource on the computer device. For example, one or more applications 10 (FIG. 6) may select one or more camera resources 20 (FIG. 6) to capture a scene and/or perform video processing. For example, one application 10 may be a video call application, such as but not limited to a SKYPE™ application, and may want to use a camera resource 20 to capture images for a video call, while another application 10 may be a photo application and may want to use a camera resource 20 to capture an image for a photograph.

The physical location information 30 (FIG. 6) of the selected camera resource 20 (FIG. 6) may correspond to a static orientation 32 (FIG. 6) of the selected camera resource 20 on the computer device 102 (FIG. 6). For example, the static orientation 32 may indicate whether the selected camera resource 20 is physically located on a side of the computer device 102 that includes a first display 14 (FIG. 6) and/or a second display 16 (FIG. 6) or on a rear surface of the computer device 102. A data repository on computer device 102 may, for example, contain the physical location information 30 of the camera resources 20 on computer device 102.

At 1004, method 1000 may include determining a dynamic orientation of the selected camera resource based on sensor information for the selected camera resource. A dynamic orientation determiner component 46 (FIG. 6) may apply one or more rules to determine the dynamic orientation 34 (FIG. 6) of a selected camera resource 20. For example, the dynamic orientation 34 of the selected camera resource 20 may be front facing and/or rear facing.

The dynamic orientation determiner component 46 may receive sensor information 40 from one or more sensors 25 on computer device 102 to aid in determining the dynamic orientation 34 of the selected camera resource 20. Sensor information 40 may include a connector status 42 indicating a relative angular distance between the first display 14 and the second display 16.

Sensor information 40 may also include a sensor orientation 44 that indicates an orientation of the first display 14 and/or the second display 16. For example, the sensor orientation 44 may indicate a general orientation of the first display 14 and/or the second display 16 (e.g., a direction the first display 14 and/or the second display 16 are facing).

The sensor orientation 44 may also indicate a relative position of the first display 14 and/or the second display 16. For example, the sensor orientation may indicate a measure of how the first display 14 and/or the second display 16 are relatively angularly positioned. As such, the sensor orientation 44 may be used to indicate whether the computer device 102 is opened flat with the first display 14 and/or the second display 16 facing the same direction, and hence the camera resources 20 facing in the same direction), or if the computer device 102 is closed or partially closed with first display 14 and/or the second display 16 and the corresponding camera resources 20 facing in different directions.

The dynamic orientation determiner component 46 may include a connector threshold 48 that may be used in determining when to update the dynamic orientation 34 of the selected camera resource 20. For example, when the sensor information 40 indicates that the connector 24 exceeds a connector threshold 48, the dynamic orientation 34 may be rear facing. Another example may include when the sensor information 40 indicates that the connector 24 is below a connector threshold 48, the dynamic orientation 34 may be front facing.

At 1006, method 1000 may include determining a camera role of the selected camera resource based on the dynamic orientation and the static orientation of the selected camera resource, wherein the camera role comprises a front facing camera role or a rear facing camera role. The camera role determiner component 35 (FIG. 6) may receive the static orientation 32 and/or the dynamic orientation 34 of the selected camera resource 20 and may determine a camera role for the selected camera resource 20. A camera role may include a forward facing camera role 38 and/or a rear facing camera role 39. For example, a forward facing camera role 38 may be associated with a forward facing camera resource, e.g., facing toward a front side of the computer device 102, which is also generally associated with facing a user of the computer device 102. In contrast, the rear facing camera role 39 may be associated with a rear facing camera.

When the dynamic orientation 34 of the selected camera resource 20 is different from the static orientation 32 of the selected camera resource 20, the camera role of the selected camera resource 20 may change. For example, the camera role may change from a forward facing camera role 38 to a rear facing camera role 39 or from a rear facing camera role 39 to a forward facing camera role 38 based on a current orientation of the selected camera resource 20.

At 1008, method 1000, may include displaying a mirrored preview image when the camera role of the selected camera resource is the front facing camera role. An image preview component 36 may receive the camera role of the selected camera resource 20 and may determine whether the preview image 18 should be a mirrored preview image 17. For example, the forward facing camera role 38 may be associated with presenting a mirrored preview image 17 on the first display 14 and/or the second display 16. The image preview component 36 may transmit the mirrored preview image 17 to a display component 56 to display the mirrored preview image 17 on the first display 14 and/or the second display 16. For example, when using a forward facing camera, a user sees a mirrored preview image 17 of the scene toward the front side of the device, such as when a user previews a selfie picture.

At 1010, method 1000 may include displaying a non-mirrored preview image when the camera role of the selected camera resource is the rear facing camera role. An image preview component 36 may receive the camera role of the selected camera resource 20 and may determine whether the preview image 18 should be a non-mirrored preview image 19. When the received camera role is a rear facing camera role 39, the image preview component 36 may determine that the preview image 18 should be a non-mirrored preview image 19. The image preview component 36 may transmit the non-mirrored preview image 19 to a display component 56 to display the non-mirrored preview image 19 on the first display 14 and/or the second display 16. In other words, the non-mirrored preview image 19 is an image that matches a view of a scene as observed by a user of the device.

Figure 11:
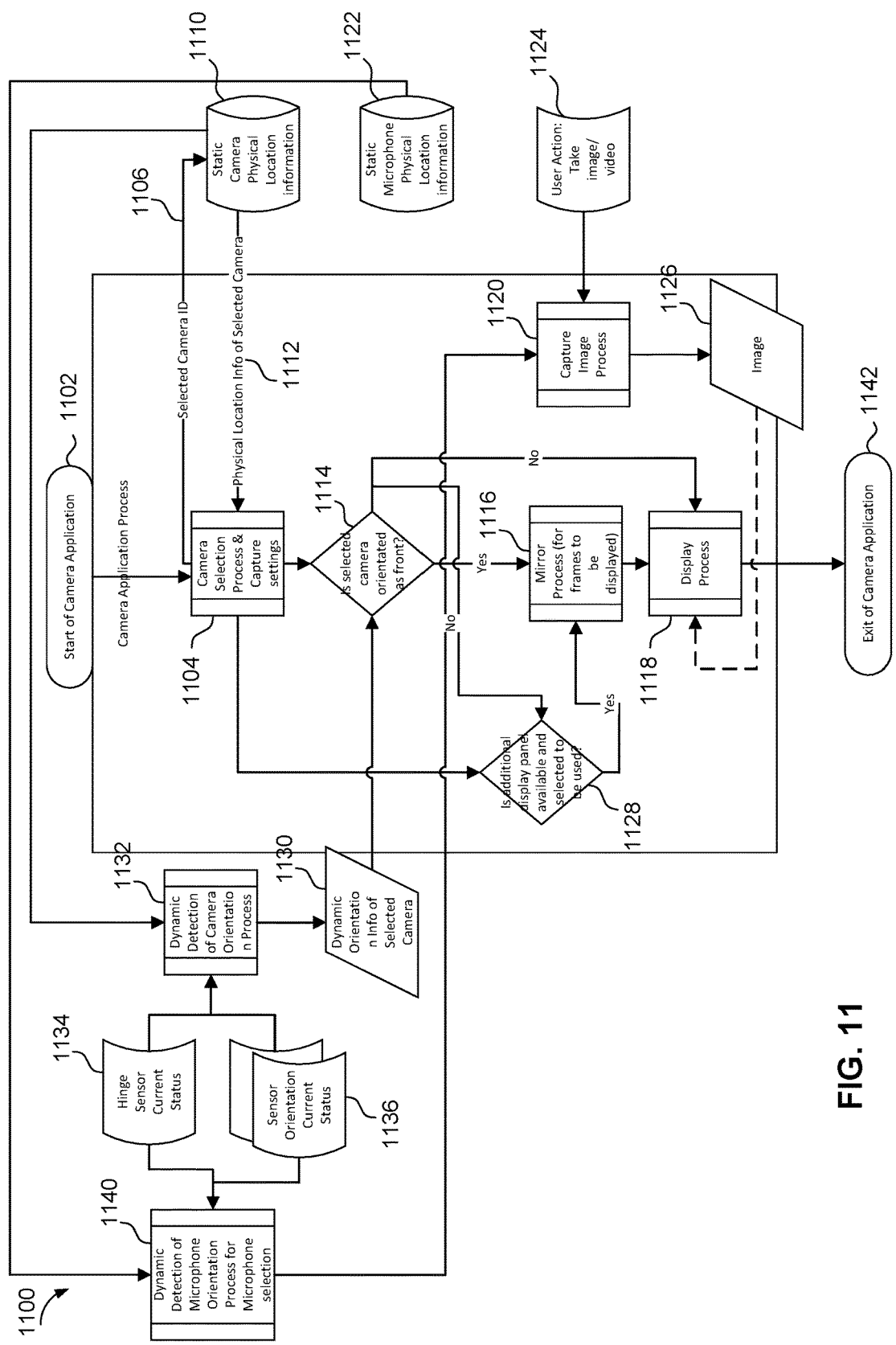
FIG. 11 is a flowchart of an example method for dynamically controlling mirroring of a preview image in accordance with an implementation of the present disclosure.

Referring now to FIG. 11, illustrated is one example implementation of a method 1100 for using an application 10 (FIG. 6) to dynamically controlling mirroring of a preview image 18 (FIG. 6) based on a dynamic orientation 34 (FIG. 6) of a selected camera resource 20 (FIG. 6) on a computer device 102 (FIG. 6). At 1102, method 1100 may include starting an application. In an aspect, one or more applications 10 (FIG. 6) may be selected to capture a scene and/or perform video processing. For example, computer device 102 may have one application 10 selected for a Skype call and another application 10 selected to capture an image of a scene.

At 1104, method 1100 may include selecting a camera resource to use with the application. For example, the application 10 may automatically select the camera resource 20 to use. Another example may include a user of computer device 102 selecting the camera resource 20 to use. The selected camera resource 20 (FIG. 1) may be, for example, a front facing camera resource and/or a rear facing camera resource. Whether the selected camera resource 20 is front facing and/or rear facing may be based on a static orientation 32 (FIG. 6) of the selected camera resource 20.

At 1106, method 1100 may include sending a request for the physical location information of the selected camera resource. The request may include, for example, the selected camera identification (ID) 12 (FIG. 6). A data repository associated with computer device 102 may include the physical location information 30 (FIG. 6) of the selected camera resource 20.

At 1110 and 1112, method 1100 may include retrieving the physical location information for the selected camera and returning the physical location information for the selected camera. For example, the physical location information 30 for the selected camera resource 20 may be returned to application 10. The physical location information 30 may indicate whether the selected camera resource 20 is located on the front of the computer device 102 (e.g., on a side of the computer device 102 that includes the screen/displays) or whether the selected camera resource 20 is located on the rear of the computer device 102 (e.g., on the side of computer device 102 without any displays).

At 1114, method 1100 may include determining whether the selected camera resource is oriented towards the front. For example, a dynamic orientation determiner component 46 (FIG. 6) may determine a dynamic orientation 34 (FIG. 6) of the selected camera resource 20. The dynamic orientation 34 may indicate whether the selected camera resource 20 is front facing and/or rear facing.

At 1132, method 1100 may include a dynamic detection of the camera resource orientation. For example, the dynamic orientation determiner component 46 may receive the physical location information 30 of the selected camera resource 20. In addition, the dynamic orientation determiner component 46 may receive sensor information 40 relating to the selected camera resource 20. The sensor information 40 may be received from one or more sensors 25 on computer device 102.

At 1134 and 1136, method 1100 may include receiving the connector sensor current status and the sensor orientation current status. For example, the dynamic orientation determiner component 46 may receive the connector status 42 from one or more sensors 25 (FIG. 1) that indicates a relative angular distance between the first display 14 and the second display 16.

In addition, the dynamic orientation determiner component 46 may receive the sensor orientation 44 from one or more sensors 25 on computer device 102. The sensor orientation 44 may also indicate a relative position of the first display 14 and/or the second display 16. For example, the sensor orientation may indicate a measure of how the first display 14 and/or the second display 16 are relatively angularly positioned. As such, the sensor orientation 44 may be used to indicate whether the computer device 102 is opened flat with the first display 14 and/or the second display 16 facing the same direction, and hence the camera resources 20 facing in the same direction), or if the computer device 102 is closed or partially closed with first display 14 and/or the second display 16 and the corresponding camera resources 20 facing in different directions. The dynamic orientation 34 of the selected camera resource 20 may be dynamically updated as the orientation of the selected camera resource 20 changes.

At 1128, method 1100 may include determining whether an additional display panel may be available and selected to be used. For example, application 10 may determine whether an additional panel may be available to be used. In addition, application 10 may allow a user to select whether the camera frames may be presented on the first display 14, or the second display 16, or on both the first display 14 and the second display 16.

At 1116, method 1100 may include mirroring the preview image displayed when the selected camera resource is oriented as a front facing camera resource. For example, when the dynamic orientation 34 and/or the static orientation 32 indicates that the selected camera resource 20 may be forward facing, image preview component 36 may determine that a mirrored preview image 17 (FIG. 6) should be presented on a first display 14 and/or a second display 16 of computer device 102.

At 1118, method 1100 may include presenting the preview image 18 on a display. When the dynamic orientation 34 and/or the static orientation 32 indicates that the selected camera resource 20 may be rear facing, the image preview component 36 may determine that a non-mirrored preview image 19 may be displayed on the first display 14 and/or the second display 16. However, when the selected camera resource 20 is front facing, a mirrored preview image 17 may be presented on the first display 14 and/or the second display 16.

At 1140, method 1100 may optionally include a dynamic detection of a microphone orientation for a selected microphone for use when the image or video is captured. Audio selection component 54 may select one or more microphones 22 (FIG. 6) for use with the image capture and/or video processing. Audio selection component 54 may select a particular microphone for use based on, for example, the sensor orientation 44 information of the computer device 102. For example, if a user is taking a video, audio selection component 54 may select the microphone 22 on the first device portion 26 or second device portion 28 facing the subject of the video. In addition, if a user is participating in a Skype call, audio selection component 54 may select a plurality of microphones 22 to use with the call.

At 1122, method 1100 may receive the physical location information for a selected microphone. For example, audio selection component 54 may receive one or more physical locations of the selected microphones 22 on computer device 102. For example, computer device 102 may have a front facing microphone and/or a rear facing microphone. The selected microphones 22 may change as the image capture and/or image processing changes.

At 1120 and 1124, method 1100 may include taking an image and/or video. For example, the selected camera resource 20 may be used by application 10 to capture an image and/or video of a scene. In addition, application 10 may receive the captured image and/or video for further processing and/or display.

At 1118 and 1126, method 1100 may include transmitting the captured image for display and displaying the captured image. For example, application 10 may transmit the captured image for display and the captured image may be displayed on first display 14 and/or second display 16.

Figure 12:
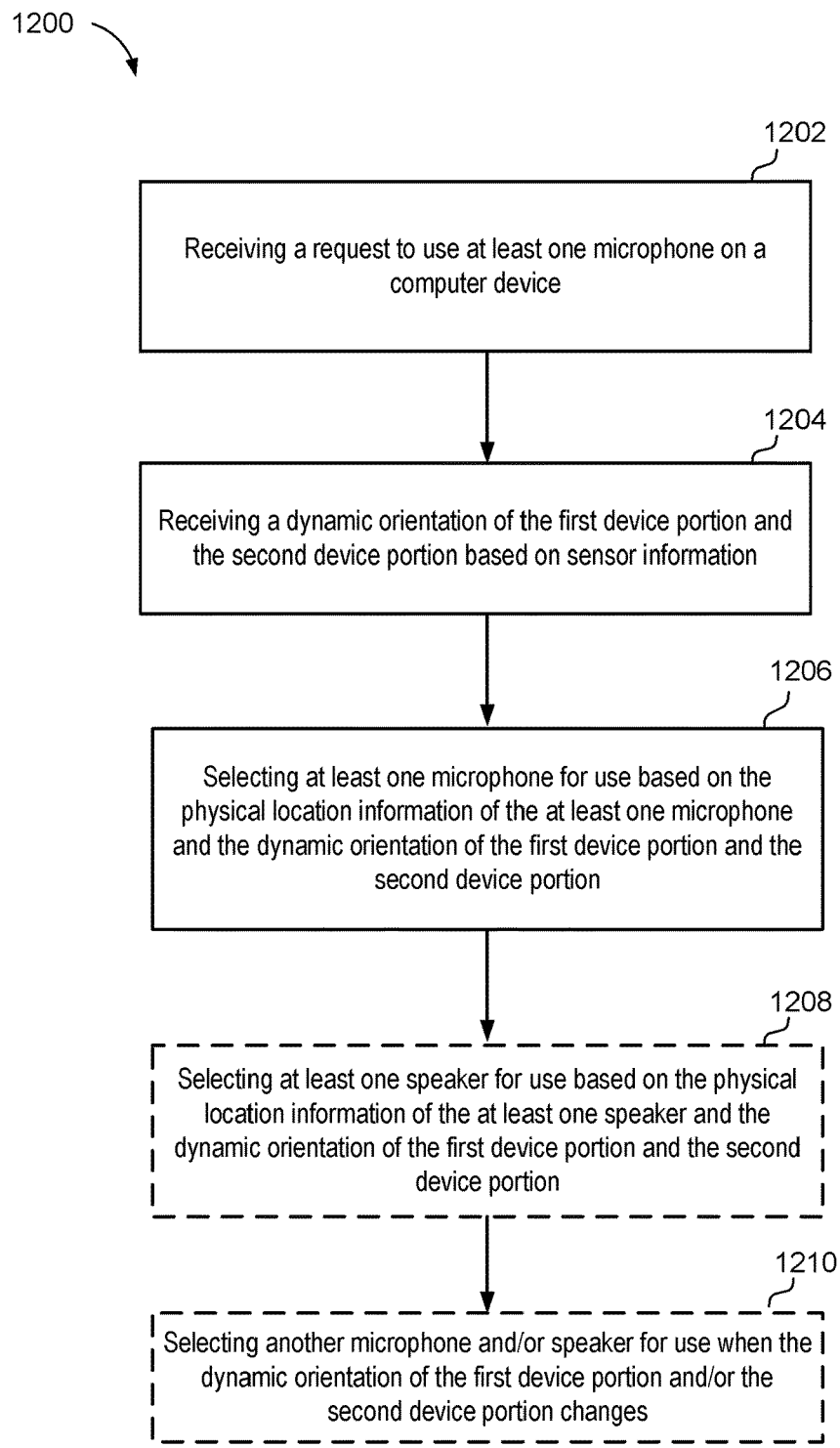
FIG. 12 is a flowchart of an example method for dynamically selecting an audio resource in accordance with an implementation of the present disclosure.

Referring now to FIG. 12, an example method 1200 may be used by computer device 102 (FIG. 6) to dynamically select one or more audio resources on computer device 102. For example, computer device 102 may include a plurality of microphones 41, 43, 45, and 47 (FIG. 1A) and/or speakers 49, 51, 53, and 55 (FIG. 1A) that may be used to respectively record and/or play audio.

At 1202, method 1200 may include receiving a request to use at least one microphone on a computer device. For example, operating system 110 and/or audio selection component 54 (FIG. 6) may receive a request from one or more applications 10 (FIG. 6) to use one or more microphones 41, 43, 45, and 47 and/or speakers 49, 51, 53, and 55 on computer device 102. The one or more applications 10 may define a use of the microphones and/or speakers. For example, the one or more applications 10 may use the microphones and/or speakers to facilitate a call, such as a video call or a telephone call. In addition, the one or more applications may use the microphones and/or speakers to respectively record and/or play audio.

At 1204, method 1200 may include receiving a dynamic orientation of the first device portion and the second device portion based on sensor information. The sensor information may include a connector status of a connector that rotatably connects the first device portion and the second device portion and an angular distance between the first device portion and the second device portion. The connector status and the angular distance may be compared to a connector threshold to determine a general orientation and a relative position of the first device portion and the second device portion. As such, the dynamic orientation may identify a general orientation and a relative position of the first device portion and the second device portion. For example, operating system 110 and/or audio selection component 54 may receive the dynamic orientation 34 of the first device portion 26 and the second device portion 28.

At 1206, method 1200 may include selecting at least one microphone for use based on the physical location information of the at least one microphone and the dynamic orientation of the first device portion and the second device portion. Audio selection component 54 may select one or more microphones 70 (FIG. 7) to use to capture audio based on the microphone physical location 68 (FIG. 7) and the dynamic orientation 34 information received. As such, the at least one microphone is used to record audio information. In addition, audio selection component 54 may also select one or more microphones 70 for use based on the one or more applications 10 requesting to use the microphones. One example may include a user recording a video using a camera resource 20 on a second device portion 28 facing away from the user. Audio selection component 54 may use the dynamic orientation information 34 to determine that the second device portion 28 is facing away from the user and may use the microphone physical location 68 to select a microphone on the second device portion 28. The user may also want to make a Skype call using the first display 14. For example, operating system 110 and/or audio selection component 54 may select one or more microphones and/or speakers on the first device portion 26 to use with the Skype call.

At 1208, method 1200 may optionally include selecting at least one speaker for use based on the physical location information of the at least one speaker and the dynamic orientation of the first device portion and the second device portion. For example, operating system 110 and/or audio selection component 54 may also select one or more speakers 71 (FIG. 7) to use to play audio based on the speaker physical location 69 (FIG. 7) and the dynamic orientation 34 of the first device portion 26 and the second device portion 28. Optionally, at 1208 method 1200 may include dynamically changing the at least one speaker selected for use when the dynamic orientation of the first device portion or the second device portion changes.

Another example use case may include a user using the computer device 102 to talk on the phone. The user may have the first device portion 26 facing the user, while the second display device portion 28 faces away from the user. As such, audio selection component 54 may select at least one microphone and speaker on the first device portion 26 facing the user (e.g., microphone 41 and speaker 49) to be active so that the user can carry on the telephone conversation, while the microphones 45, 47 and speakers 53, 55 on the second device portion 28 facing away from the user may not be used, or may be selected for echo cancellation.

Another use case may include receiving information indicating that two users may be on a Skype call with one user facing a first display 14 and the other user facing the second display 16. For example, audio selection component 54 may select microphones and speakers on both the first device portion 26 with the first display 14 and the second device portion 28 with the second display 16 to respectively record or emit sound for both users of the same device on the Skype call.

At 1210, method 1200 may optionally include selecting another microphone and/or speaker for use when the dynamic orientation of the first device portion and/or the second device portion changes. Audio selection component 54 may select a different speaker and/or microphone for use when the dynamic orientation of the first device portion 26 and/or the second device portion 28 changes. For example, if a user is using computer device 102 to talk on the telephone with the first device portion 26 facing the user, audio selection component 54 may select microphones 41, 43 and speakers 49, 51 for use with the call. If the user rotates the computer device 102 so that the first device portion 26 is facing away from the user and the second device portion 28 is now facing towards the user, audio selection component 54 may select microphones 45, 47 and speakers 53, 55 to use with the call and deactivate microphones 41, 43 and speakers 49, 51.

Also, in some cases, the method 1200 may include dynamically changing the at least one microphone selected for use when a different application requests use of the at least one microphone.

Thus, in this implementation, a computer device includes a first device portion, a second device portion, a memory to store data and instructions, a processor in communication with the memory, and an operating system in communication with the memory and the processor. Further, in this case, the operating system is operable to receive a request to use at least one microphone on the computer device, receive a dynamic orientation of the first device portion and the second device portion based on sensor information, and select at least one microphone for use based on the physical location information of the at least one microphone and the dynamic orientation of the first device portion and the second device portion. The physical location information corresponds to a static orientation of the at least one microphone on the computer device.

In some cases, the sensor information includes a connector status of a connector that rotatably connects the first device portion and the second device portion and an angular distance between the first device portion and the second device portion. In some additional cases, the operating system is further operable to determine the dynamic orientation of the first portion and the second device portion by comparing the connector status and the angular distance to a connector threshold to determine a general orientation and a relative position of the first device portion and the second device portion.

In some cases, the operating system is further operable to select another microphone for use when the dynamic orientation of the first device portion or the second device portion changes.

Also, in some cases, the request is from at least one application executing on the computer device. In such instances, the operating system may be further operable to dynamically change the at least one microphone selected for use when a different application requests use of the at least one microphone.

In other cases, the operating system is further operable to select at least one speaker to use based on the physical location information of the at least one speaker and the dynamic orientation of the first device portion and the second device portion, wherein the physical location information corresponds to a static orientation of the at least one speaker on the computer device. In some additional cases, the operating system is further operable to dynamically change the at least one speaker selected for use when the dynamic orientation of the first device portion or the second device portion changes.

In some cases, the processor is further operable to use the at least one microphone to record audio information.

Figure 13:
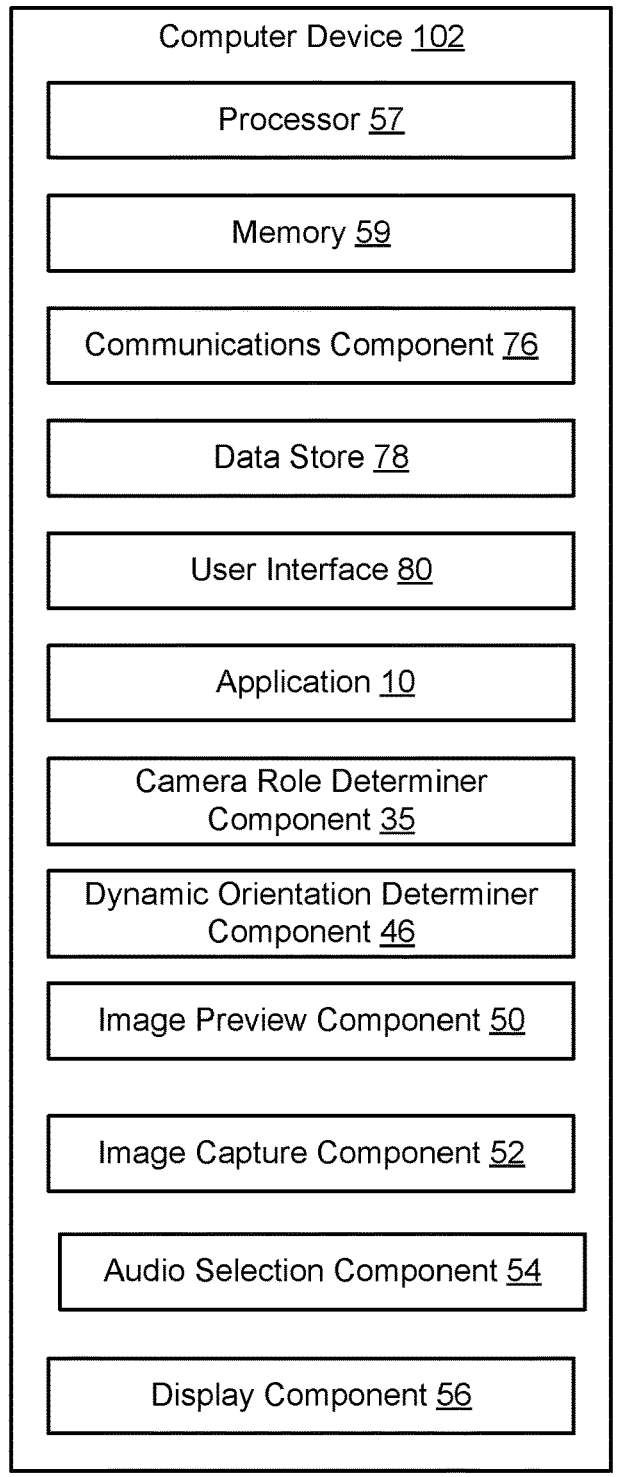
FIG. 13 is a schematic block diagram of an example device in accordance with an implementation of the present disclosure.

Referring now to FIG. 13, illustrated is an example computer device 102 in accordance with an implementation, including additional component details as compared to FIG. 1. In one example, computer device 102 may include processor 57 for carrying out processing functions associated with one or more of components and functions described herein. Processor 57 can include a single or multiple set of processors or multi-core processors. Moreover, processor 57 can be implemented as an integrated processing system and/or a distributed processing system.

Computer device 102 may further include memory 59, such as for storing local versions of applications being executed by processor 57. Memory 59 can include a type of memory usable by a computer, such as random access memory (RAM), read only memory (ROM), tapes, magnetic discs, optical discs, volatile memory, non-volatile memory, and any combination thereof. Additionally, processor 57 and memory 59 may include and execute operating system 110 (FIG. 1).

Further, computer device 102 may include a communications component 76 that provides for establishing and maintaining communications with one or more parties utilizing hardware, software, and services as described herein. Communications component 76 may carry communications between components on computer device 102, as well as between computer device 102 and external devices, such as devices located across a communications network and/or devices serially or locally connected to computer device 102. For example, communications component 76 may include one or more buses, and may further include transmit chain components and receive chain components associated with a transmitter and receiver, respectively, operable for interfacing with external devices.

Additionally, computer device 102 may include a data store 78, which can be any suitable combination of hardware and/or software, that provides for mass storage of information, databases, and programs employed in connection with implementations described herein. For example, data store 78 may be a data repository for application 10 (FIG. 6), camera role determiner component 35 (FIG. 6), dynamic orientation determiner component 46 (FIG. 6), image preview component 50 (FIG. 6), image capture component 52 (FIG. 6), audio selection component 54 and/or display component 56 (FIG. 1).

Computer device 102 may also include a user interface component 80 operable to receive inputs from a user of computer device 102 and further operable to generate outputs for presentation to the user. User interface component 80 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 80 may include one or more output devices, including but not limited to a display, a speaker, a haptic feedback mechanism, a printer, any other mechanism capable of presenting an output to a user, or any combination thereof.

In an implementation, user interface component 80 may transmit and/or receive messages corresponding to the operation of application 10, camera role determiner component 35, dynamic orientation determiner component 46, image preview component 50, image capture component 52, audio selection component 54, and/or display component 56. In addition, processor 57 executes application 10, camera role determiner component 35, dynamic orientation determiner component 46, image preview component 50, image capture component 52, audio selection component 54, and/or display component 56 and memory 59 or data store 78 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
a first device portion comprising a first display;
a second device portion comprising a second display;
a memory to store data and instructions;
a processor in communication with the memory; and
an operating system in communication with the memory and the processor, wherein the operating system is operable to:
receive physical location information of a selected camera resource on the computer device, wherein the physical location information corresponds to a static orientation of the camera resource on the computer device;
determine a dynamic orientation of the selected camera resource based on sensor information for the selected camera resource, wherein the sensor information includes a connector status of a connector that rotatably connects the first display and the second display;
determine a camera role of the selected camera resource based on the dynamic orientation and the static orientation of the selected camera, wherein the camera role comprises a front facing camera role or a rear facing camera role;
display a mirrored preview image when the camera role of the selected camera resource is the front facing camera role; and
display a non-mirrored preview image when the camera role of the selected camera resource is the rear facing camera role.

2. The computer device of claim 1, wherein the sensor information further includes the connector status and an angular distance between the first display and the second display.

3. The computer device of claim 1, wherein the operating system is further operable to determine the dynamic orientation of the selected camera resource by comparing the connector status to a connector threshold to determine at least in part whether the selected camera resource is associated with the front facing camera role or the rear facing camera role.

4. The computer device of claim 3, wherein the operating system is further operable to determine at least in part that the selected camera resource is associated with the rear facing camera role when the connector status exceeds the connector threshold; and
wherein the operating system is further operable to determine at least in part that the selected camera resource is associated with the front facing camera role when the connector status is below the connector threshold.

5. The computer device of claim 1, wherein the sensor information includes a connector orientation that indicates a general orientation and a relative position of the first display and the second display, and wherein the processor is further operable to determine at least in part that the selected camera resource is associated with the rear facing camera role or the forward facing camera role based on a value of the sensor orientation.

6. The computer device of claim 1, wherein the processor is further operable to use the selected camera resource to capture an image or a video.

7. The computer device of claim 6, wherein the processor is further operable to display the captured image or video on at least one display of the computer device.

8. The computer device of claim 1, wherein the processor is further operable to:
receive physical location information for one or more microphones on the computer device, wherein the physical location information corresponds to a static orientation of the one or more microphones;

receive a selection on at least one microphone to use by comparing the dynamic orientation of the selected camera with the static orientation of the at least one microphone; and record audio information from the at least one microphone corresponding to when the image or the video is captured.

9. A method for dynamically controlling mirroring of a preview image, the method comprising:
receiving, by an operating system on a computer device, physical location information of a selected camera resource on the computer device, wherein the physical location information corresponds to a static orientation of the camera resource on the computer device;
determining a dynamic orientation of the selected camera resource based on sensor information for the selected camera resource, wherein the sensor information includes a connector status of a connector that rotatably connects a first display and a second display of the computer device;
determining a camera role of the selected camera resource based on the dynamic orientation and the static orientation of the selected camera, wherein the camera role comprises a front facing camera role or a rear facing camera role;
displaying a mirrored preview image when the camera role of the selected camera resource is the front facing camera role; and
displaying a non-mirrored preview image when the camera role of the selected camera resource is the rear facing camera role.

10. The method of claim 9, wherein the sensor information further includes the connector status and an angular distance between the first display and the second display.

11. The method of claim 9, wherein determining the dynamic orientation of the selected camera resource further comprises:
comparing the connector status to a connector threshold to determine at least in part whether the selected camera resource is associated with the front facing camera role or the rear facing camera role.

12. The method of claim 11, wherein determining the camera role of the selected camera resource further comprises:
determining at least in part that the selected camera resource is associated with the rear facing camera role when the connector status exceeds the connector threshold, and
determining at least in part that the selected camera resource is associated with the front facing camera role when the connector status is below the connector threshold.

13. The method of claim 9, wherein the sensor information includes a connector orientation that indicates a general orientation and a relative position of a first display and a second display of the computer device; and
wherein determining the camera role of the selected camera may further include determining at least in part that the selected camera resource is associated with the rear facing camera role or the forward facing camera role based on a value of the sensor orientation.

14. The method of claim 9, further comprising capturing an image or a video using the selected camera resource.

15. The method of claim 9, further comprising displaying the captured image or video on at least one display of the computer device.

16. The method of claim 9, further comprising:
receiving physical location information for one or more microphones on the computer device, wherein the physical location information corresponds to a static orientation of the one or more microphones;
receiving a selection on at least one microphone to use by comparing the dynamic orientation of the selected camera with the static orientation of the at least one microphone; and
recording audio information from the at least one microphone corresponding to when the image or the video is captured.

17. A non-transitory computer-readable medium storing instructions executable by a computer device, comprising:
at least one instruction for causing the computer device to receive physical location information of a selected camera resource on the computer device, wherein the physical location information corresponds to a static orientation of the camera resource on the computer device;
at least one instruction for causing the computer device to determine a dynamic orientation of the selected camera resource based on sensor information for the selected camera resource, wherein the sensor information includes a connector status of a connector that rotatably connects a first display and a second display of the computer device;
at least one instruction for causing the computer device to determine a camera role of the selected camera resource based on the dynamic orientation and the static orientation of the selected camera, wherein the camera role comprises a front facing camera role or a rear facing camera role;
at least one instruction for causing the computer device to display a mirrored preview image when the camera role of the selected camera resource is the front facing camera role; and
at least one instruction for causing the computer device to display a non-mirrored preview image when the camera role of the selected camera resource is the rear facing camera role.

* * * * *